(12) United States Patent
Takeda

(10) Patent No.: US 12,439,097 B2
(45) Date of Patent: Oct. 7, 2025

(54) IMAGE SHARING METHOD AND IMAGE SHARING SYSTEM, AND STORAGE MEDIUM

(71) Applicant: CANON KABUSHIKI KAISHA, Tokyo (JP)

(72) Inventor: Eishi Takeda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 98 days.

(21) Appl. No.: 18/593,792

(22) Filed: Mar. 1, 2024

(65) Prior Publication Data

US 2024/0305835 A1 Sep. 12, 2024

(30) Foreign Application Priority Data

Mar. 8, 2023 (JP) ................................ 2023-035860
Dec. 5, 2023 (JP) ................................ 2023-205438

(51) Int. Cl.
*H04N 21/218* (2011.01)
*G06F 3/01* (2006.01)
*G06T 15/20* (2011.01)
*H04N 21/2543* (2011.01)
*H04N 21/266* (2011.01)
*H04N 21/442* (2011.01)
*H04N 21/81* (2011.01)

(52) U.S. Cl.
CPC ....... *H04N 21/21805* (2013.01); *G06F 3/011* (2013.01); *G06F 3/016* (2013.01); *G06T 15/20* (2013.01); *H04N 21/2543* (2013.01); *H04N 21/266* (2013.01); *H04N 21/44218* (2013.01); *H04N 21/8146* (2013.01)

(58) Field of Classification Search
CPC ......... H04N 21/21805; H04N 21/2543; H04N 21/266; H04N 21/44218; H04N 21/8146; G06F 3/011; G06F 3/016; G06T 15/20
See application file for complete search history.

(56) References Cited

U.S. PATENT DOCUMENTS 10,713,834 B2 * 7/2020 Nakashima ............. G06F 3/012
11,551,645 B2 * 1/2023 Imamura .................. G09G 5/38
12,058,401 B2 * 8/2024 Homma ............... H04N 21/816
2023/0385011 A1 * 11/2023 Shimizu ................. H04N 7/157

FOREIGN PATENT DOCUMENTS

JP        H08336166 A      12/1996

* cited by examiner

*Primary Examiner* — Mulugeta Mengesha
(74) *Attorney, Agent, or Firm* — Canon U.S.A., Inc. IP Division

(57) ABSTRACT

An image sharing method including generating image data of an image from a viewpoint at a position based on image data obtained from a plurality of image capturing apparatuses that capture images of the same subject simultaneously, setting a cyber space for viewing the image data from the viewing apparatuses, and distributing the image data to each of the plurality of viewing apparatuses. Information on an avatar, an initial viewing position in the cyber space, and the motion information of a viewer of each viewing apparatus is obtained and environment data pertaining to an avatar of another viewing apparatus based on a viewpoint in the cyber space obtained based on the initial viewing position and the motion information is sent to each viewing apparatus.

24 Claims, 16 Drawing Sheets

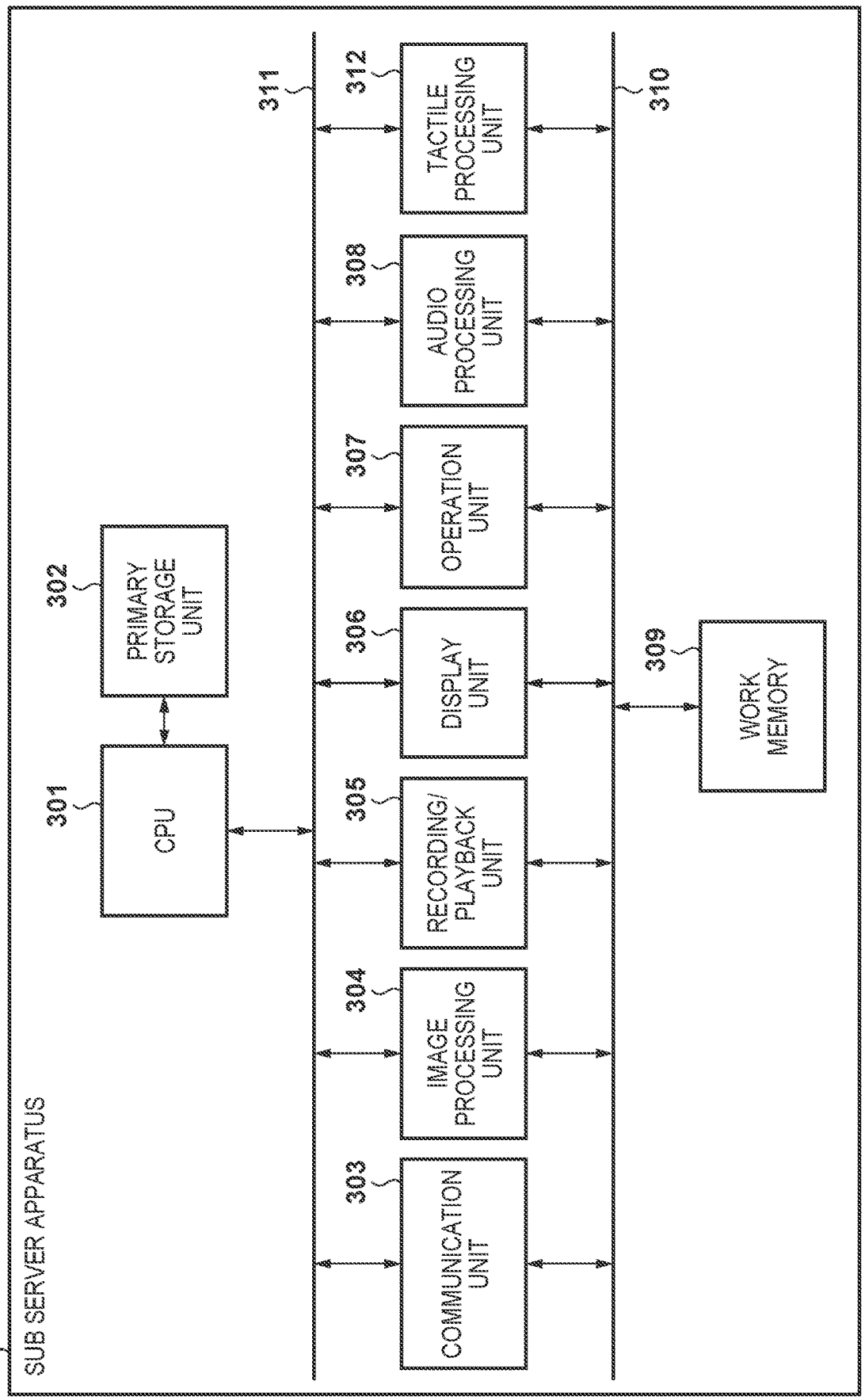

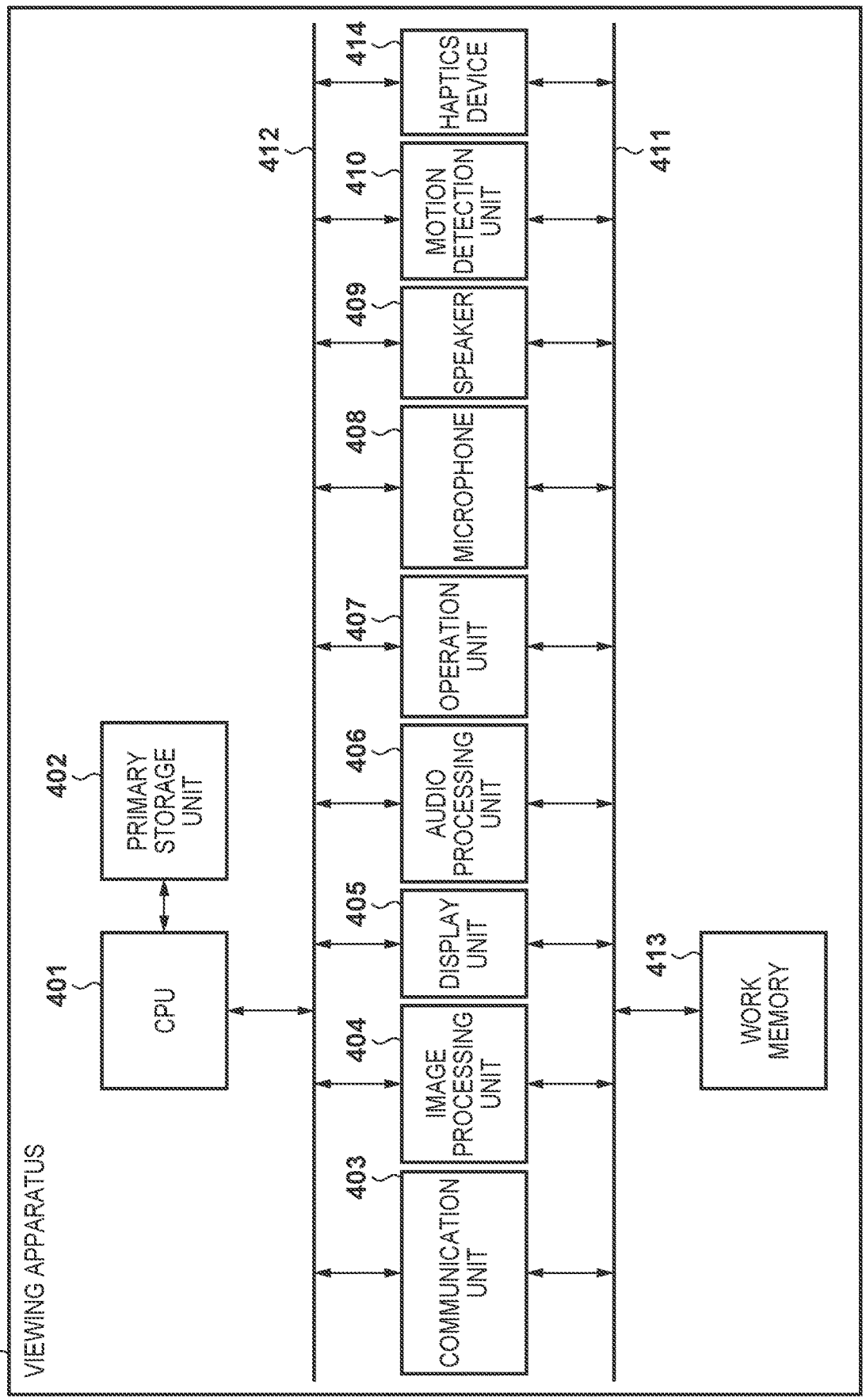

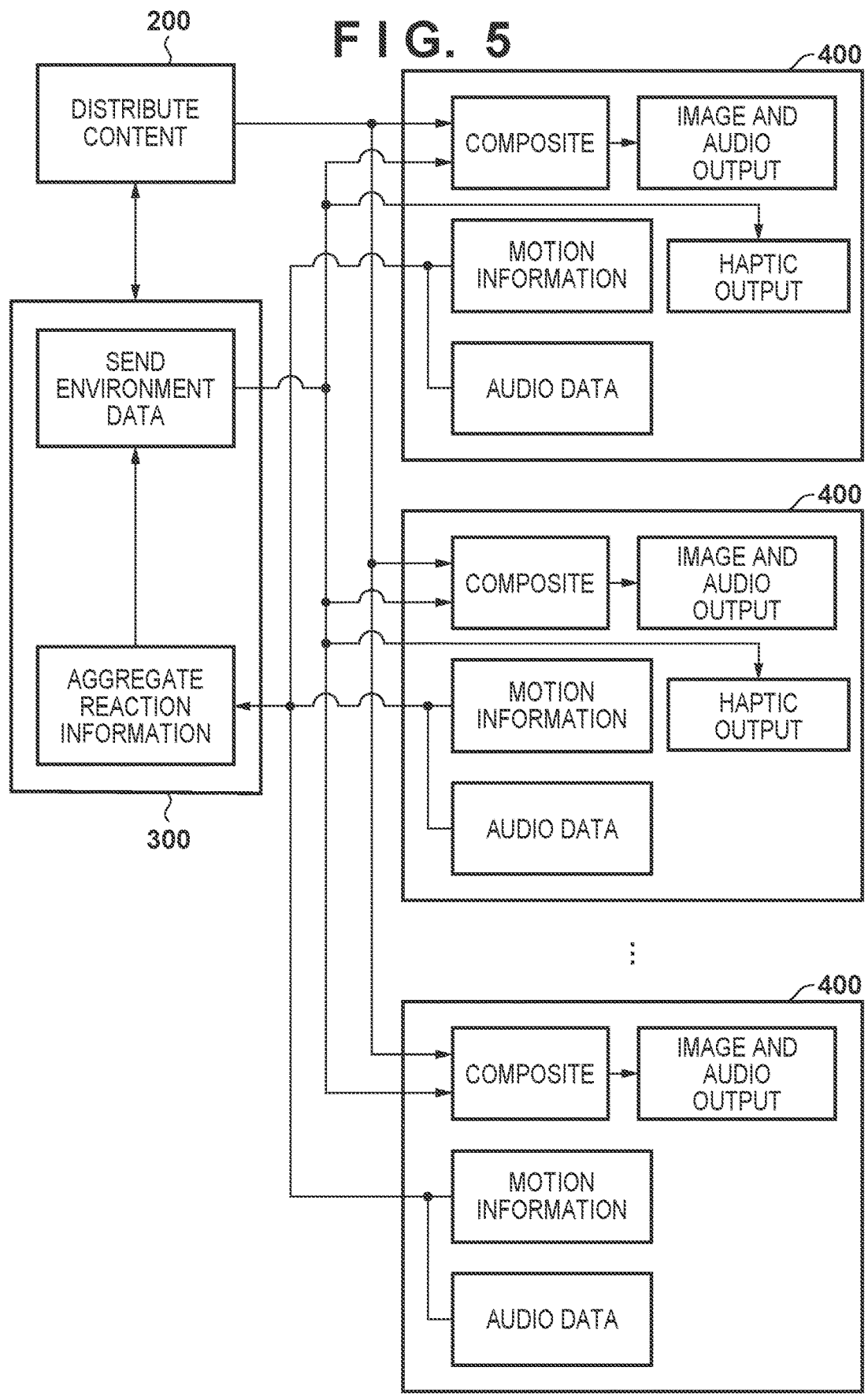

FIG. 6A

| AVATAR ID | | NNNN |
|---|---|---|
| AUDIO DATA | | audio.wav |
| ACTION ID | | NNN |
| 6DoF CHANGE AMOUNT INFORMATION | Right/Left | xxx[cm] |
| | Forward/Backward | yyy[cm] |
| | Up/Down | zzzz[cm] |
| | Roll | aaa[deg] |
| | Yaw | bbb[deg] |
| | Pitch | ccc[deg] |
| HAPTICS DATA | | NNNN.hap |

FIG. 6B

| AVATAR ID | | NNNN |
|---|---|---|
| AVATAR DATA WITH ACTION | | avatar.vrm |
| AUDIO DATA | | audio.wav |
| 6DoF CHANGE AMOUNT INFORMATION | Right/Left | xxx[cm] |
| | Forward/Backward | yyy[cm] |
| | Up/Down | zzzz[cm] |
| | Roll | aaa[deg] |
| | Yaw | bbb[deg] |
| | Pitch | ccc[deg] |

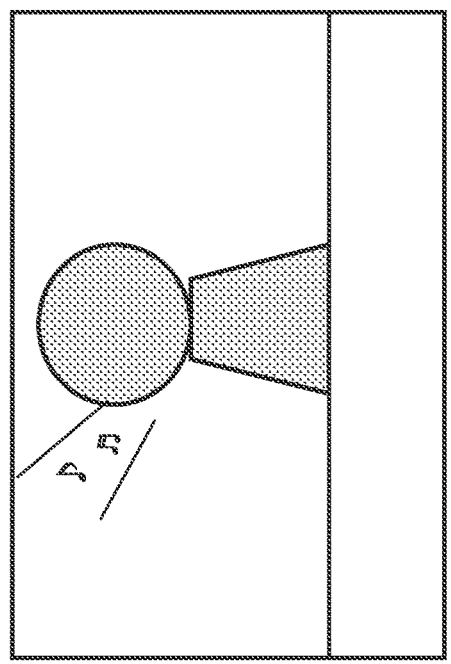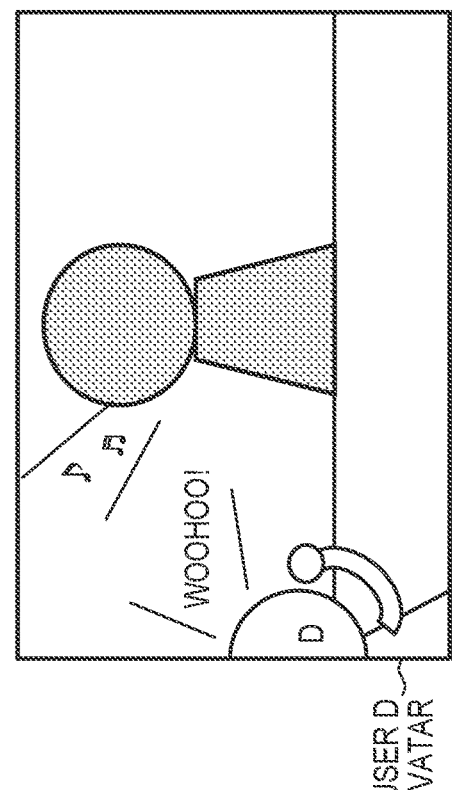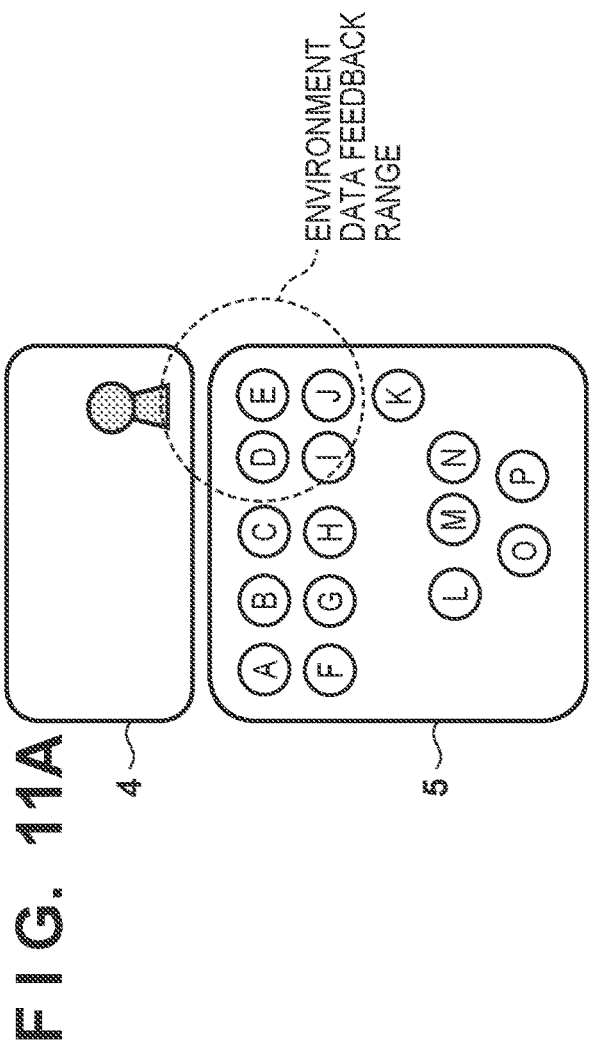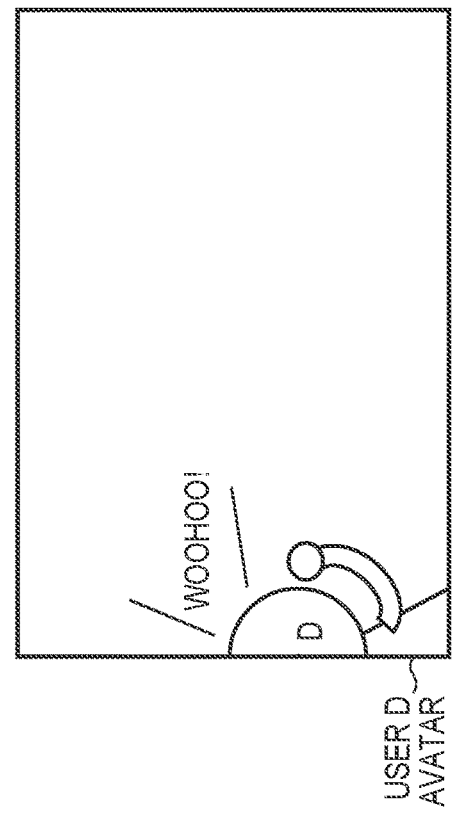
FIG. 11A
FIG. 11B
FIG. 11C
FIG. 11D

| 8 | 10 | 10 | 10 | 9 |
|---|----|----|----|---|
| 7 | 7  | 8  | 7  | 6 |
| 2 | 5  | 6  | 5  | 0 |
| 0 | 1  | 2  | 0  | 0 |
| 0 | 0  | 0  | 1  | 0 |

IMAGE SHARING METHOD AND IMAGE SHARING SYSTEM, AND STORAGE MEDIUM

BACKGROUND

Field of the Disclosure

The present disclosure relates to an image sharing method and an image sharing system, and a storage medium.

Description of the Related Art

Recent years have seen an increase in opportunities to stream music festivals, live performances, theater productions, sports, and the like. It is also becoming more common to see environments where free viewpoint images, which can be seen from any desired viewpoint, are generated based on multi-viewpoint image data obtained by using a plurality of image capturing apparatuses placed at different locations to shoot images simultaneously. In the future, such multi-viewpoint image data is expected to be distributed as packaged content over broadcast waves, or via disks or subscription video on demand, in addition to conventional single-viewpoint images shot from a single viewpoint.

Physical interplay between performers, participants, and other attendees is one of the unique pleasures of attending an event such as a live performance or a sports game in person at a real venue. For example, many things can happen at a live music performance, such as a performer diving into the front row of the crowd or crowd surfing, attendees lifting each other up, and call and response between performers and attendees, as well as attendees making contact with each other, losing sight of the stage, and more. However, such physical interplay is absent in conventional one-way online video sharing, making it difficult for viewers to feel the same sense of immersion and participation as if they were actually at the venue.

Japanese Patent Laid-Open No. 08-336166 discloses a video viewing apparatus capable of enabling a plurality of viewers to view the same space. By sending information on the position and direction of the viewpoint of each viewer in a cyber space from remote terminals to a host terminal, the video viewing apparatus enables a plurality of viewers to view images and audio from their respective viewpoints.

In this manner, the plurality of viewers supply information pertaining to their respective viewpoints and audio to the distributor of the multi-viewpoint image data, which makes it possible for any number of viewers to view the distributed content while sharing the same cyber space.

However, although the technique disclosed in Japanese Patent Laid-Open No. 08-336166 allows any number of viewers to view video from their respective viewpoints in the same cyber space, there is no interplay between viewers, the subjects in the video distributed, and so on in the video.

SUMMARY

The present disclosure has been made in consideration of making it possible for viewers to feel a heightened sense of immersion when viewing distributed content.

According to the present disclosure, provided is an image sharing method including generating first image data of an image from a viewpoint at a position based on image data obtained from a plurality of image capturing apparatuses that capture images of the same subject simultaneously; setting a cyber space for viewing the first image data from a plurality of viewing apparatuses; distributing the first image data to each of the plurality of viewing apparatuses; obtaining, from each viewing apparatus among the plurality of viewing apparatuses, information on an avatar, an initial viewing position in the cyber space, and motion information of a viewer who uses the viewing apparatus for the viewing; and sending, to each viewing apparatus, environment data pertaining to an avatar of another viewing apparatus that enters a field of view of the viewing apparatus in the cyber space, based on a viewpoint in the cyber space obtained based on the initial viewing position and the motion information.

Further, according to the present disclosure, provided is an image sharing system comprising one or more processors and/or circuitry which function as: a distributing unit that generates first image data capable of generating an image from a viewpoint at a position based on image data obtained from a plurality of image capturing apparatuses that capture images of the same subject simultaneously, and distributes the first image data to a plurality of viewing apparatuses; a setting unit that sets a cyber space for viewing the first image data from the plurality of viewing apparatuses, prior to the distribution; an obtainment unit that obtains, from each viewing apparatus among the plurality of viewing apparatuses, information on an avatar, an initial viewing position in the cyber space, and motion information of a viewer who uses the viewing apparatus for the viewing; and a processing unit that sends, to each viewing apparatus, environment data pertaining to an avatar of another viewing apparatus that enters a field of view of the viewing apparatus in the cyber space, based on a viewpoint in the cyber space obtained based on the initial viewing position and the motion information.

Furthermore, according to the present disclosure, provided is a storage medium storing a program that is executable by the computer, wherein the program includes program code for causing the computer to perform an image sharing method comprising: generating first image data of an image from a viewpoint at a position based on image data obtained from a plurality of image capturing apparatuses that capture images of the same subject simultaneously; setting a cyber space for viewing the first image data from a plurality of viewing apparatuses, prior to the distributing; distributing the first image data to each of a plurality of viewing apparatuses; obtaining, from each viewing apparatus among the plurality of viewing apparatuses, information on an avatar, an initial viewing position in the cyber space, and motion information of a viewer who uses the viewing apparatus for the viewing; and sending, to each viewing apparatus, environment data pertaining to an avatar of another viewing apparatus that enters a field of view of the viewing apparatus in the cyber space, based on a viewpoint in the cyber space obtained based on the initial viewing position and the motion information.

Further features of the present disclosure will become apparent from the following description of embodiments (with reference to the attached drawings).

BRIEF DESCRIPTION OF THE DRAWINGS

The accompanying drawings, which are incorporated in and constitute a part of the specification, illustrate embodiments of the disclosure, and together with the description, serve to explain the principles of the disclosure.

FIG. 3 is a block diagram illustrating a functional configuration of a sub server apparatus according to embodiments.

FIG. 4 is a block diagram illustrating a functional configuration of a viewing apparatus according to embodiments.

FIG. 5 is a conceptual diagram illustrating a flow of data in the video distribution system according to embodiments.

FIGS. 6A and 6B are diagrams illustrating examples of avatar information and reaction information according to embodiments.

FIGS. 11A to 11D are diagrams illustrating a relationship between a viewpoint in a cyber space and a displayed image according to the first embodiment.

DESCRIPTION OF THE EMBODIMENTS

Figure 1:
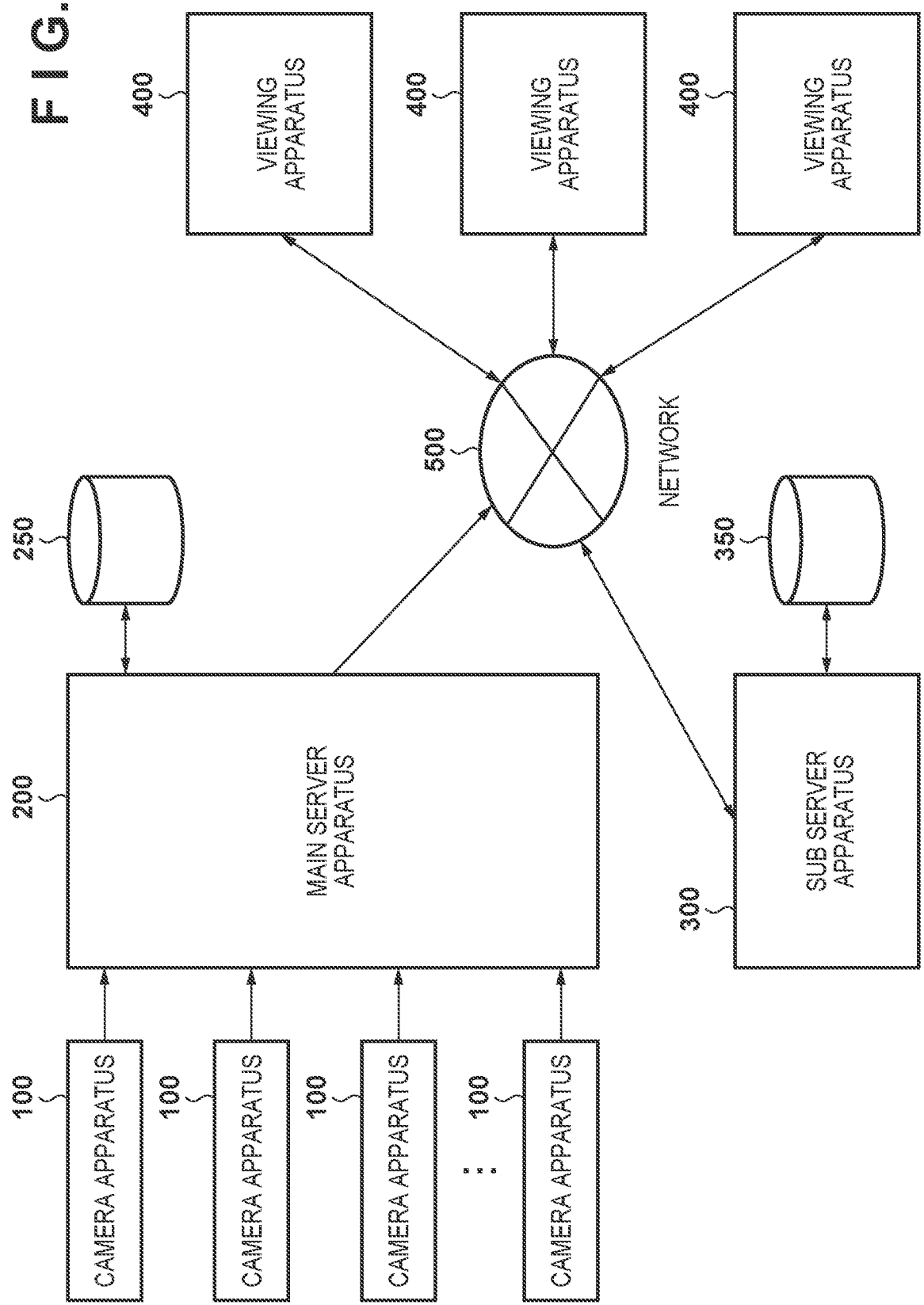
FIG. 1 is a conceptual diagram illustrating a configuration of an video distribution system according to embodiments of the present disclosure.

Hereinafter, embodiments will be described in detail with reference to the attached drawings. Note, the following embodiments are not intended to limit the scope of the claimed disclosure, and limitation is not made to a disclosure that requires a combination of all features described in the embodiments. Two or more of the multiple features described in the embodiments may be combined as appropriate. Furthermore, the same reference numerals are given to the same or similar configurations, and redundant description thereof is omitted.

FIG. 1 is a conceptual diagram illustrating the configuration of a video distribution system according to the present embodiment.

The video distribution system according to the present embodiment includes, on a distribution side, a plurality of camera apparatuses 100, a main server apparatus 200, storage 250 connected to the main server apparatus 200, a sub server apparatus 300, and storage 350 connected to the sub server apparatus 300. The system also includes a plurality of viewing apparatuses 400 on a viewing side, and the plurality of viewing apparatuses 400, the main server apparatus 200, and the sub server apparatus 300 are connected over a network 500.

The plurality of camera apparatuses 100 are connected to the main server apparatus 200, and each has a function for shooting an image and a function for collecting audio. As will be described later, images are shot and sound is collected simultaneously from a plurality of predetermined positions relative to a subject to be shot, and the obtained image data and audio data are output to the main server apparatus 200.

The configurations of the main server apparatus 200, the sub server apparatus 300, and the viewing apparatus 400, which constitute the video distribution system, will be described further hereinafter.

Figure 2:
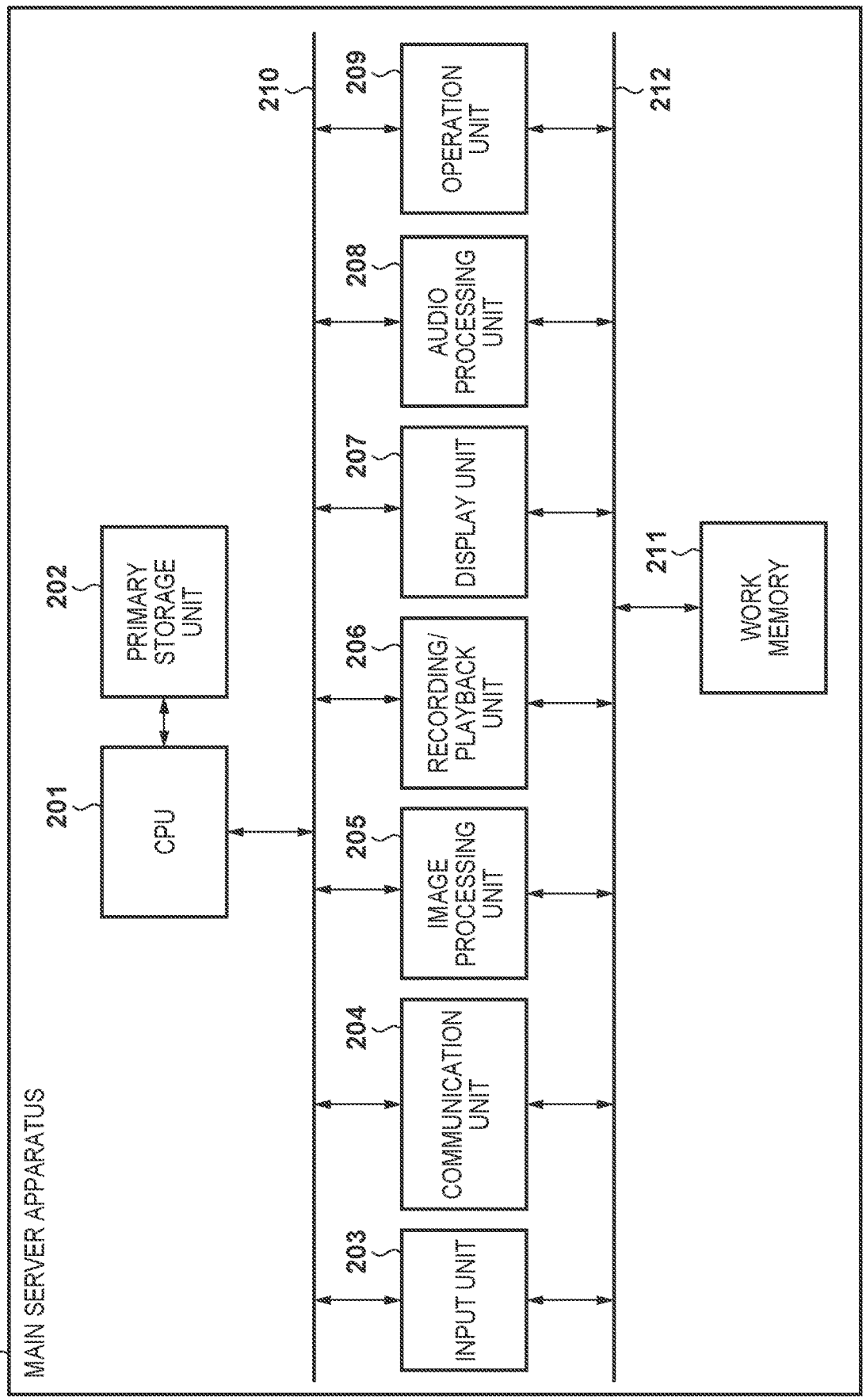
FIG. 2 is a block diagram illustrating a functional configuration of a main server apparatus according to embodiments.

FIG. 2 is a block diagram illustrating the configuration of the main server apparatus 200.

In the main server apparatus 200, an input unit 203, a communication unit 204, an image processing unit 205, a recording/playback unit 206, a display unit 207, an audio processing unit 208, and an operation unit 209 are connected to a CPU 201 over a CPU bus 210, and are controlled by the CPU 201. The input unit 203, the communication unit 204, the image processing unit 205, the recording/playback unit 206, the display unit 207, the audio processing unit 208, and the operation unit 209 are also connected to a work memory 211 over a memory bus 212.

The CPU 201 is a processor that controls the elements of the main server apparatus 200. A primary storage unit 202 is constituted by a ROM, a RAM, or the like, and stores processing programs, data, and the like for causing the CPU 201 to operate, including performing processing for distributing content.

The plurality of camera apparatuses 100 are connected over the input unit 203, and input viewpoint information such as the positions, orientations, and the like of the plurality of camera apparatuses 100, as well as image data and audio data from the camera apparatuses 100. The embodiments of the present disclosure assume that a large amount of data captured by the plurality of cameras is processed quickly and securely at the same time, and the elements of the system are directly connected through a dedicated interface or the like. However, if synchronized control, data transfer, and information security can be ensured among the cameras, the plurality of camera apparatuses 100 may be connected via the communication unit 204 over the network 500.

Based on the image data obtained by the plurality of camera apparatuses 100 capturing images of the same subject simultaneously, and the viewpoint information from each camera apparatus 100, the image processing unit 205 reconfigures the data into three-dimensional data of the subject present in an image space (called "3D spatial data" hereinafter). This 3D spatial data can be used to generate a two-dimensional image viewed from a desired viewpoint, or image data of an image in a cyber space. In the following descriptions, the term "viewpoint" used alone is assumed to refer to both the position and the orientation of a viewpoint, whereas the phrases "position of a viewpoint" and "orientation of a viewpoint" are assumed to refer specifically to the position and the orientation, respectively.

The audio processing unit 208 performs predetermined processing on the audio data input from the camera apparatuses 100. The CPU 201 then collects the 3D spatial data and audio data in a predetermined format for each frame, and generates 3D spatial data with audio.

The generated 3D spatial data with audio is stored in the mass storage 250, an external storage medium such as a disk-based memory or a card-based memory (not shown), or the like, through the recording/playback unit 206. The 3D spatial data with audio stored in the mass storage 250 is read out through the recording/playback unit 206 as necessary, and can be distributed to each viewing apparatus 400 as content from the communication unit 204 over the network 500.

The communication unit 204 is used to connect to the network 500, either wirelessly or over wires.

The display unit 207 displays images input from the input unit 203, images, text, icons, and the like for controlling the main server apparatus 200, and the like. A user can control the main server apparatus 200 by operating an operation member connected to the operation unit 209 based on the displayed content. For example, by executing an editing application for images, audio, and the like stored in the primary storage unit 202, the CPU 201 displays information on the image data, audio data, and the like in the display unit 207, and the user can edit the 3D spatial data with audio by operating the operation member.

The work memory 211 is used to temporarily hold various types of data that have been input, data during processing performed by the image processing unit 205 and the audio processing unit 208, variables, coefficients, and the like necessary for processing, and the like.

The operation unit 209 detects an operation made by the user on an operation member such as a remote controller, a button, or a touch panel (not shown), and communicates operation information based on the detected operation to the CPU 201. The CPU 201 performs control based on the communicated operation information.

The configuration of the sub server apparatus 300 will be described next with reference to FIG. 3.

In the sub server apparatus 300, a communication unit 303, an image processing unit 304, a recording/playback unit 305, a display unit 306, an operation unit 307, an audio processing unit 308, and a tactile processing unit 312 are connected to a CPU 301 over a CPU bus 311, and are controlled by the CPU 301. The communication unit 303, the image processing unit 304, the recording/playback unit 305, the display unit 306, the operation unit 307, the audio processing unit 308, and the tactile processing unit 312 are also connected to a work memory 309 over a memory bus 310.

The CPU 301 is a processor that controls the elements of the sub server apparatus 300. A primary storage unit 302 is constituted by a ROM, a RAM, or the like, and stores processing programs, data, and the like for causing the CPU 301 to operate, including performing processing for generating environment image data, environment audio data, and haptics data (sense information data), which will be described later.

The communication unit 303 is used to connect to the network 500, either wirelessly or over wires. The communication unit 303 obtains information pertaining to a virtual audience seat space (described later), from the main server apparatus 200 over the network 500, and inputs information such as an initial position, avatar information, device configuration information, audio data, motion information, and the like of each viewing apparatus 400, from each viewing apparatus 400. If a haptics device is included, the device configuration information includes body part information indicating the type of the haptics device and the part of the body to which the haptics device is attached is included.

The image processing unit 304 and the audio processing unit 308 combine images of avatars of the plurality of viewing apparatuses 400 with audio based on information pertaining to the virtual audience seat space input from the communication unit 303, as well as the avatar information, initial position, audio data, motion information, and the like of the plurality of viewing apparatuses 400. Hereinafter, data of the image of an avatar obtained through such compositing will be referred to as "environment image data", and data of the audio obtained through such compositing will be referred to as "environment audio data".

The tactile processing unit 312 determines, based on the device configuration information, whether the viewing apparatus 400 includes a haptics device 414 (described later), and if so, generates the haptics data.

Although the present embodiment assumes that the haptics data generates a sense of hardness, roughness, friction, temperature, and the like from the outline shape, color, and texture of the avatar image, the method is not particularly limited thereto as long as the same effect can be achieved. For example, the information of the avatar may include information pertaining to hardness, roughness, friction, temperature, and the like.

Alternatively, instead of the haptics data corresponding to the overall image of the avatar, the device configuration information may be referenced and the haptics data generated only for regions where tactile feedback can be made, according to the number of haptics devices and in the corresponding viewing apparatus 400 and the parts of the body where the devices are worn.

The environment image data, the environment audio data, and the haptics data (when present) will be collectively referred to as "environment data". The obtained environment data can be sent from the communication unit 303 to the viewing apparatus 400 over the network 500.

The display unit 306 can display images, text, icons, and the like for controlling the sub server apparatus 300, and the user can control the sub server apparatus 300 by operating an operation member connected to the operation unit 307 based on the displayed content. For example, by causing the CPU 201 to execute an application stored in the primary storage unit 302, displaying information on the virtual audience seat space in the display unit 306, and operating the operation member, the arrangement of seats, the permissible level of congestion, and the like can be set, for example.

The work memory 309 is used to temporarily hold various types of data that have been input, data during processing performed by the image processing unit 304, the audio processing unit 308, and the tactile processing unit 312, variables, coefficients, and the like necessary for processing, and the like.

The operation unit 307 detects an operation made by the user on an operation member such as a remote controller, a button, or a touch panel (not shown), and communicates operation information based on the detected operation to the CPU 301. The CPU 301 performs control based on the communicated operation information.

The configuration of the viewing apparatus 400 will be described next with reference to FIG. 4.

In the viewing apparatus 400, a communication unit 403, an image processing unit 404, a display unit 405, an audio processing unit 406, an operation unit 407, a microphone 408, a speaker 409, a motion detection unit 410, and the haptics device 414 are connected to a CPU 401 over a CPU bus 412, and are controlled by the CPU 401. The communication unit 403, the image processing unit 404, the display unit 405, the audio processing unit 406, the operation unit 407, the microphone 408, the speaker 409, the motion detection unit 410, and the haptics device 414 are also connected to a work memory 413 over a memory bus 411.

The CPU 401 is a processor that controls the elements of the viewing apparatus 400. A primary storage unit 402 is constituted by a ROM, a RAM, or the like, and stores processing programs, data, and the like for causing the CPU 401 to operate, including viewing processing (described later).

The communication unit 403 is used to connect to the network 500, either wirelessly or over wires. The communication unit 403 receives, over the network 500, content distributed from the main server apparatus 200, as well as the virtual seat information and environment data sent from the sub server apparatus 300. An initial position of the viewpoint of the viewing apparatus 400 (an initial viewing position) in the cyber space of content distributed from the main server apparatus 200 is set by using the operation unit 407 to select an unselected audience seat among the audience seats indicated by the virtual audience seat information. The communication unit 403 outputs information, such as the set initial position of the viewpoint of the viewing apparatus 400, avatar information, device configuration information, audio data, motion information, and the like, from the communication unit 403 to the sub server apparatus 300 over the network 500.

The image processing unit 404 generates image data of an image as seen from the viewpoint of the viewing apparatus 400, from the 3D spatial data of the content received through the communication unit 403, composites the image data with the environment image data, and converts the composited image data into a format compliant with the display unit 405. The viewpoint of the viewing apparatus 400 can be found based on the initial position of the viewpoint of the viewing apparatus 400 and a history of the motion information.

The audio processing unit 406 composites the audio data of the content received by the communication unit 403 over the network 500 with the environment audio data, and converts the composited audio data into a format compliant with the speaker 409. The audio processing unit 406 also converts the audio input from the microphone 408 into audio data, and the audio data resulting from the conversion is sent from the communication unit 403 to the sub server apparatus 300 over the network 500.

The haptics device 414 provides tactile feedback to the user by operating based on the haptics data included in the environment data.

The display unit 405 displays the image data processed by the image processing unit 205, displays images, text, icons, and the like for controlling the viewing apparatus 400, and provides displays for generating avatars. The user can control the viewing apparatus 400 by operating an operation member connected to the operation unit 407 based on the displayed content.

The work memory 413 is used to temporarily hold various types of data that have been input, data during processing performed by the image processing unit 404 and the audio processing unit 406, variables, coefficients, and the like necessary for processing, and the like.

The operation unit 407 detects an operation made by the user on an operation member such as a remote controller, a button, or a touch panel (not shown), and communicates operation information based on the detected operation to the CPU 401. The CPU 401 performs control based on the communicated operation information.

The motion detection unit 410 converts an amount of change obtained from a motion sensor (not shown) worn by the user, and an amount of change in the user's motion obtained by analyzing an image of the user captured by a camera (not shown) included in the viewing apparatus 400, into, for example, 6DoF change amount information. The obtained change amount information is sent to the sub server apparatus 300 as the motion information mentioned above.

Note that a head-mounted display having a display, a microphone, a speaker, and a motion detection unit may be connected to the viewing apparatus 400 and used, or the viewing apparatus 400 itself may be a head-mounted display.

FIG. 5 is a conceptual diagram illustrating the general flow of data during content distribution in the video distribution system configured as described above. It is assumed that, prior to distributing the content, the sub server apparatus 300 has already sent, to the main server apparatus 200, IP address information of the viewing apparatus 400 through which the content is to be viewed; the main server apparatus 200 has already sent configuration information on the cyber space (described later) to the sub server apparatus 300; and each viewing apparatus 400 has already sent the avatar information, the initial position of the viewpoint, and the device configuration information to the sub server apparatus 300.

The main server apparatus 200 distributes content to each of the viewing apparatuses 400 to which the content is to be distributed.

Each viewing apparatus 400 also sends the motion information detected by the motion detection unit 410 and the audio data collected by the microphone 408 to the sub server apparatus 300.

The sub server apparatus 300 obtains the motion information and audio data (collectively referred to as "reaction information" hereinafter) sent from each viewing apparatus 400.

FIG. 6A illustrates an example of the data of the avatar information and the reaction information from each viewing apparatus 400, managed by the sub server apparatus 300. An avatar ID, the audio data, an action ID, and the 6DoF change amount information of the avatar, sent from each viewing apparatus 400, are held and updated as necessary. The change amount information includes right/left, forward/backward, up/down, roll, yaw, and pitch change amounts. If the viewing apparatus 400 includes the haptics device 414, the haptics data is also held and updated as necessary.

The sub server apparatus 300 aggregates the initial position of the viewpoint, the avatar information, and the reaction information of each viewing apparatus 400, generates the environment data for each viewing apparatus 400, and sends the environment data to each viewing apparatus 400. If the viewing apparatus 400 includes the haptics device 414, the environment data is generated including the haptics data and sent.

Each viewing apparatus 400 generates an image seen from the current viewpoint from the content distributed from the main server apparatus 200, composites the image data and audio data of the generated image with the environment data sent from the sub server apparatus 300, and outputs the composite image and the composite audio. If the viewing apparatus 400 includes the haptics device 414, the haptics device 414 is driven based on the haptics data included in the environment data to provide tactile feedback.

First Embodiment

Figure 7:
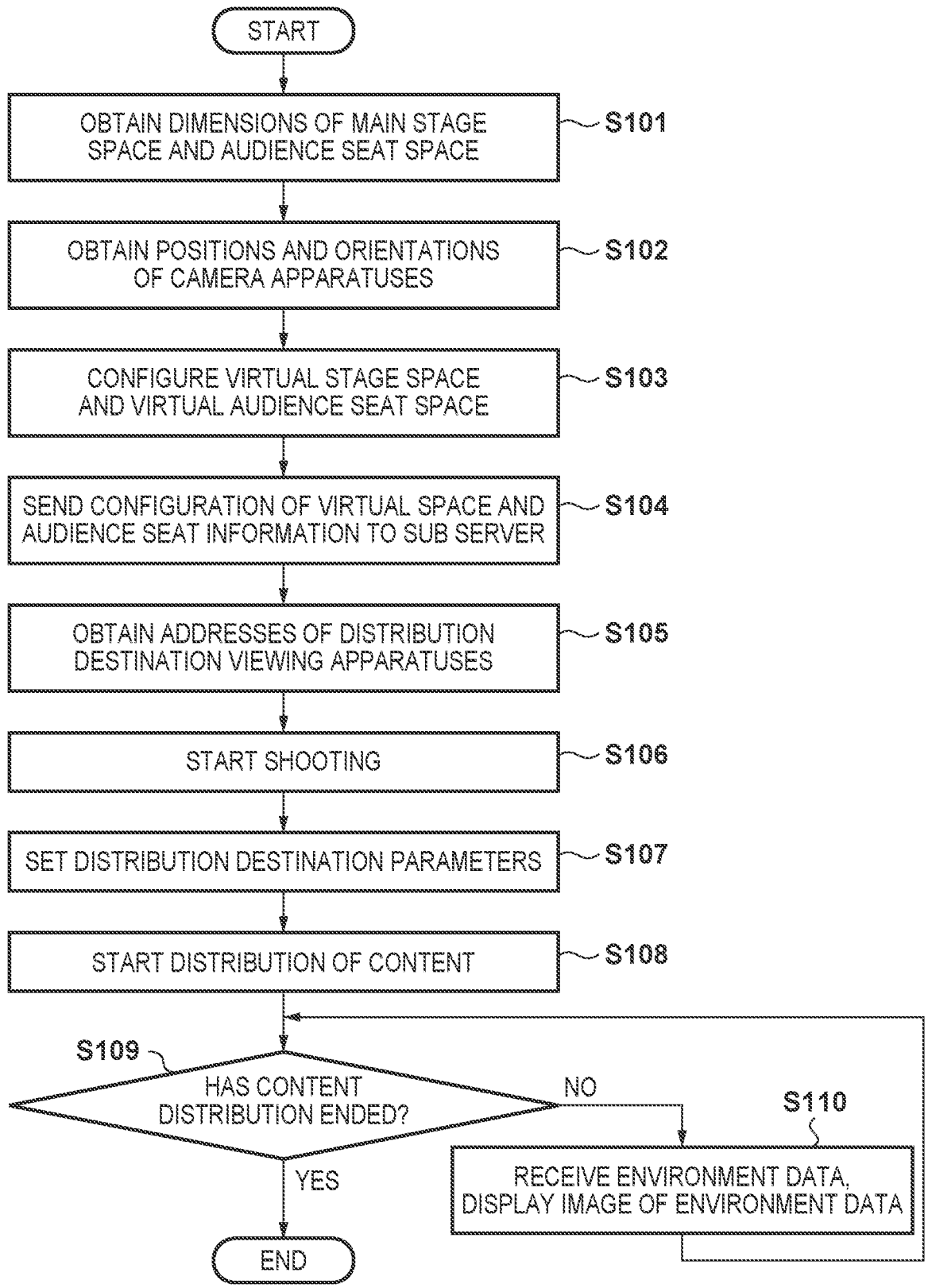
FIG. 7 is a flowchart illustrating processing performed by the main server apparatus according to a first embodiment.

Content distribution processing performed by the main server apparatus 200 according to a first embodiment will be described next with reference to FIG. 7.

Figure 8B:
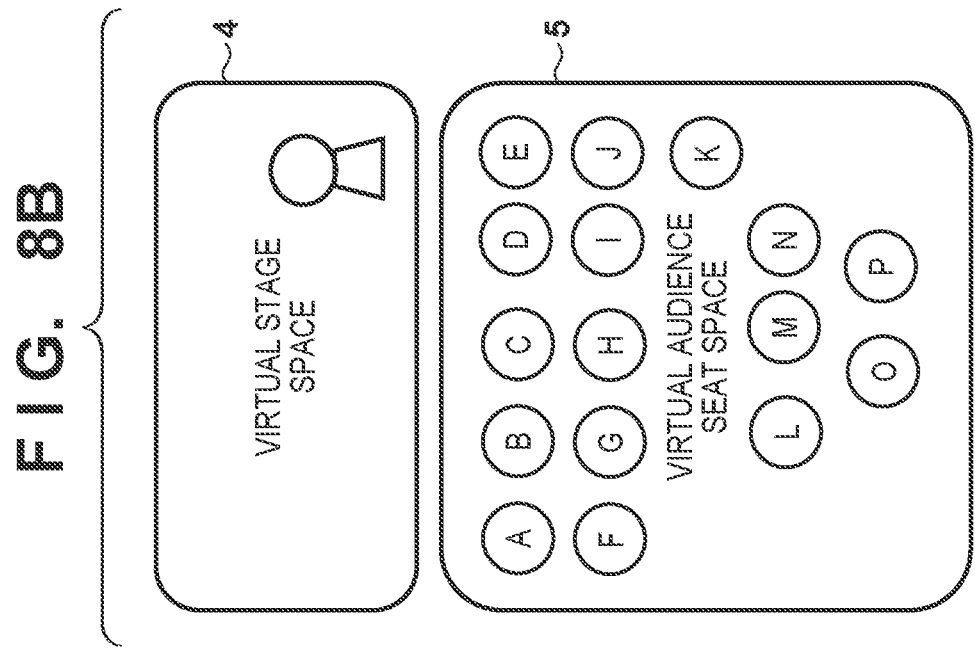
FIGS. 8A and 8B are diagrams illustrating a relationship between a physical space and a cyber space according to the first embodiment.
Figure 8A:
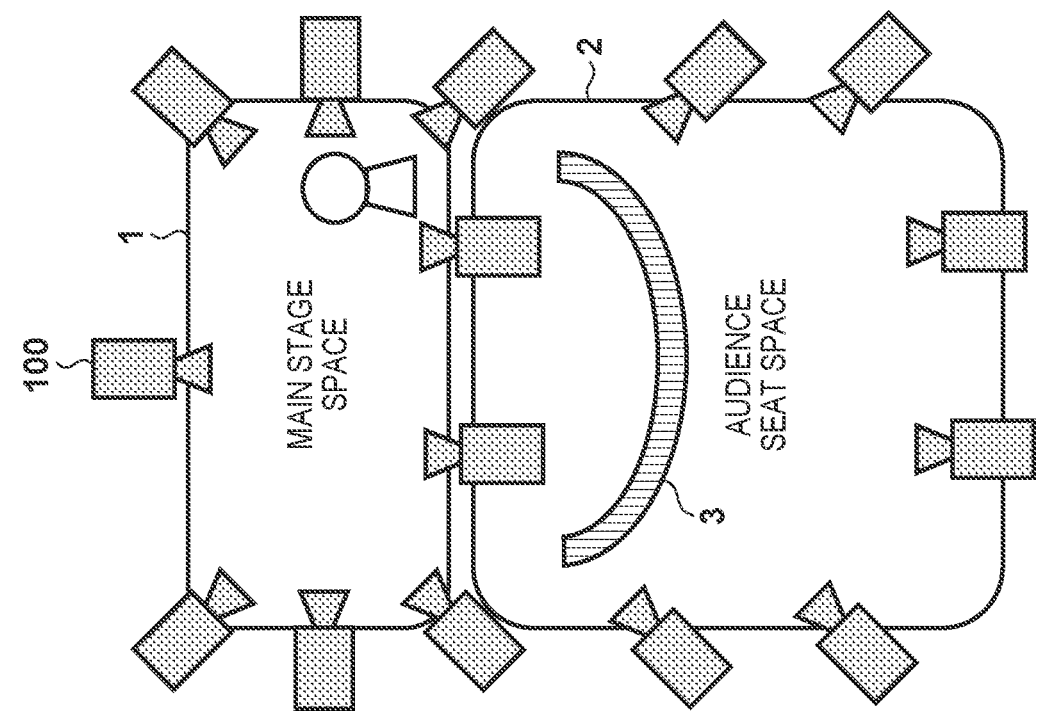

First, in step S101, the main server apparatus 200 obtains the dimensions of a three-dimensional physical space in which images are shot. FIG. 8A illustrates a plan view of a physical space including a main stage space 1 including a stage and an audience seat space 2 including audience seats, as well as an arrangement of the camera apparatuses 100, as an example of a physical space in which images are shot.

These may be measured by a worker who installed the stage where a performer performs, or may be values provided in the specifications of the venue. A screen monitor 3 may be disposed, in a position that does not interfere with the shooting by the camera apparatuses 100, such that the performer can check the reactions of the viewers. In this case, an image of the environment image data generated from a predetermined viewpoint in the main stage space 1 is displayed by the sub server apparatus 300 in the screen monitor 3.

Next, in step S102, the positions and orientations of the plurality of camera apparatuses 100 are obtained.

As the positions of the plurality of camera apparatuses 100, coordinates which take the position and orientation of one camera apparatus 100 among the plurality of camera apparatuses 100 as a reference can be used to obtain the positions and orientations of the other camera apparatuses 100, for example. Note that the reference position and orientation are not limited thereto, and any positions and orientations may be used as long as the relative positions and shooting directions of the plurality of camera apparatuses 100 can be specified. For example, the positions and orientations of the plurality of camera apparatuses 100 may be specified by coordinates which take the center of the space to be shot as the origin.

Next, in step S103, the main server apparatus 200 calculates the configuration of a cyber space corresponding to a three-dimensional physical space in which the images are shot. FIG. 8B illustrates a cyber space corresponding to FIG. 8A, and illustrates a plan view of a virtual stage space 4 corresponding to the main stage space 1 and a virtual audience seat space 5 corresponding to the audience seat space 2. Then, in step S104, the configuration of the cyber space is sent to the sub server apparatus 300.

Note that when the main server apparatus 200 finishes calculating the configuration of the cyber space in step S103, the sub server apparatus 300 searches for the viewing apparatuses 400 that wish to view the content before the content distribution is started. Then, in step S105, the IP address information of the viewing apparatuses 400 that wish to view the content is obtained from the sub server apparatus 300.

In step S106, when the plurality of camera apparatuses 100 start shooting, the main server apparatus 200 obtains image data and audio data from the plurality of camera apparatuses 100, and generates the 3D spatial data with audio (the content). Then, in step S107, distribution destination parameters of the content obtained prior to the distribution are set.

In step S108, the distribution of the content is started for each of the viewing apparatuses 400 to which the content is to be distributed. At this time, the main server apparatus 200 adds, to the 3D spatial data with audio, parameters which allow the viewing apparatus 400 to generate only image data and audio data from the viewpoint of that viewing apparatus 400.

The parameters are, for example, key information, generated based on the unique IP address of the viewing apparatus 400 obtained in the above-described step S105, for decoding 3D spatial data generated through a process including encryption. This prevents unauthorized access from unregistered viewing apparatuses 400, and prevents such viewing apparatuses 400 from surreptitiously viewing the 3D spatial data.

In step S109, whether to end the content distribution is determined. If the distribution is to be ended, the sequence moves to step S110, where the environment data from a predetermined viewpoint in the main stage space 1 is received from the sub server apparatus 300, an image of the environment data is displayed on the screen monitor 3, and audio expressed by the environment audio data is streamed using a speaker or the like (not shown). Although the processing of step S110 and the screen monitor 3 are not required, providing these enables the performer to check the reactions of the viewers, which makes it possible to increase the sense of immersion in a physical space.

If it is determined in step S109 to end the distribution, the content distribution processing ends.

Figure 9:
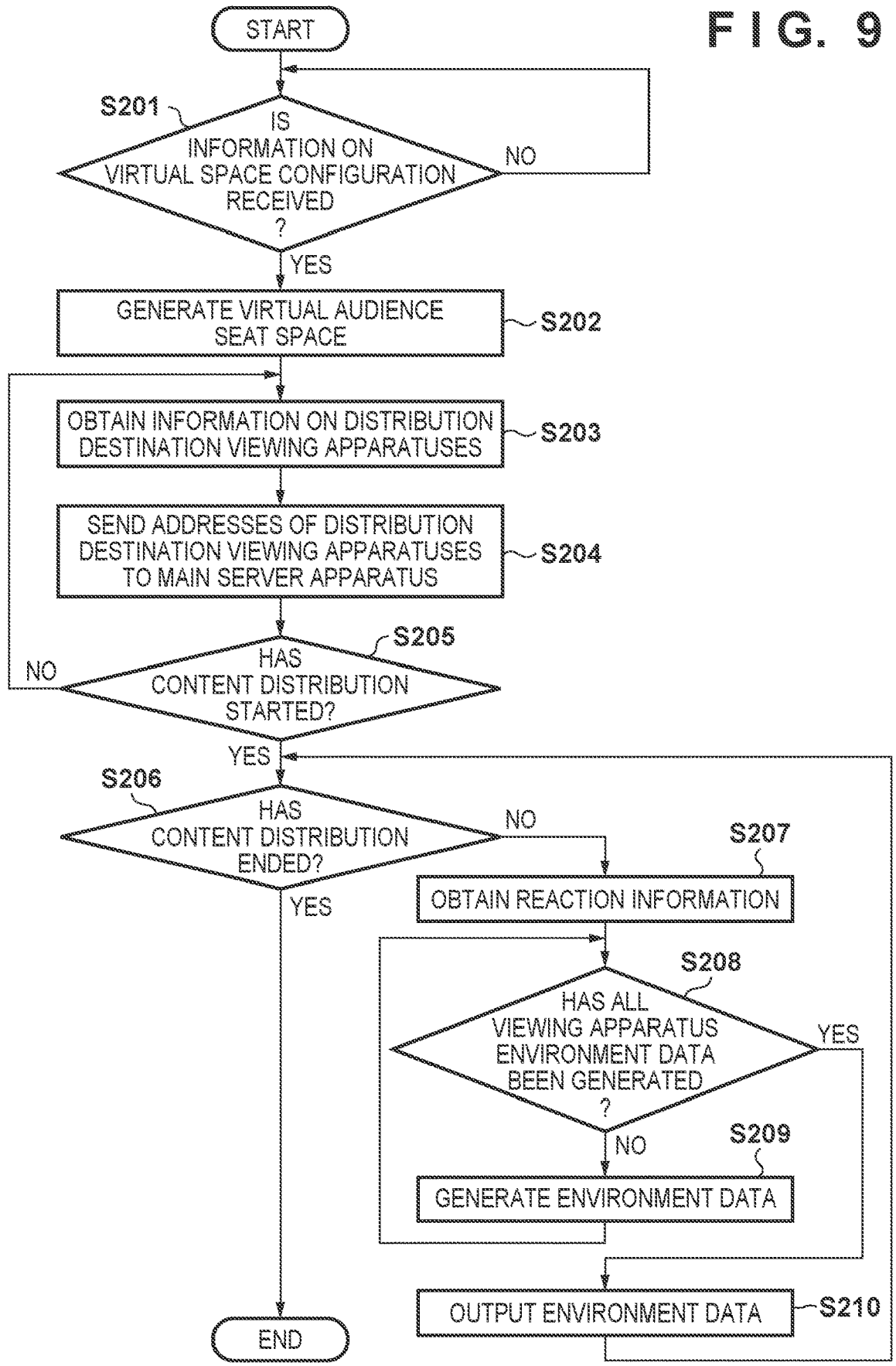
FIG. 9 is a flowchart illustrating processing performed by the sub server apparatus according to the first embodiment.

The generation and output processing of the environment data by the sub server apparatus 300 according to the present embodiment will be described next with reference to FIG. 9.

First, in step S201, the apparatus stands by for the information on the configuration of the cyber space sent from the main server apparatus 200 in step S104. Once the information on the configuration of the cyber space is received, the sequence moves to step S202, and the virtual audience seat space 5 is generated.

When the calculation of the configuration of the virtual audience seat space 5 in step S202 ends, in step S203, the main server apparatus 200 searches for the viewing apparatuses 400 that wish to view the content before the content distribution is started. Then, the selected audience seats are obtained along with information such as the avatar information, the IP addresses, the device configuration information, and the like of the viewing apparatuses 400 that wish to view the content.

In addition, in step S204, the IP addresses of the viewing apparatuses 400 that wish to view the content are sent to the main server apparatus 200.

Note that a fee may be charged when an application to view the content is made, and the amount charged may differ depending on the location of the audience seat.

Next, in step S205, it is determined whether or not the main server apparatus 200 has started distributing the content. If so, the sequence moves to step S206, and if not, the sequence returns to step S203 and the processing is repeated.

In step S206, it is determined whether the main server apparatus 200 has ended the distribution of the content, and if so, the processing ends. However, if the distribution has not ended, the sequence moves to step S207, where the reaction information is obtained from the viewing apparatuses 400 to which the content is being distributed.

In step S208, it is determined whether the environment data has been generated for each of the viewing apparatuses 400 to which the content is being distributed. Note that specific examples of the environment data will be described later with reference to FIGS. 11A to 11D and FIGS. 12A to 12D.

If a viewing apparatus 400 for which the environment data has not been generated is present, in step S209, the environment data of that viewing apparatus 400 is generated, and the sequence returns to step S208. However, if the environment data has been generated for all the viewing apparatuses 400 to which the content is being distributed, the environment data generated in step S210 is output to each viewing apparatus 400, and the sequence then returns to step S206. Note that the timing at which the environment data is output is not limited thereto, and the environment data may be output to each corresponding viewing apparatus 400 in sequence each time the environment data is generated in step S209.

Figure 10:
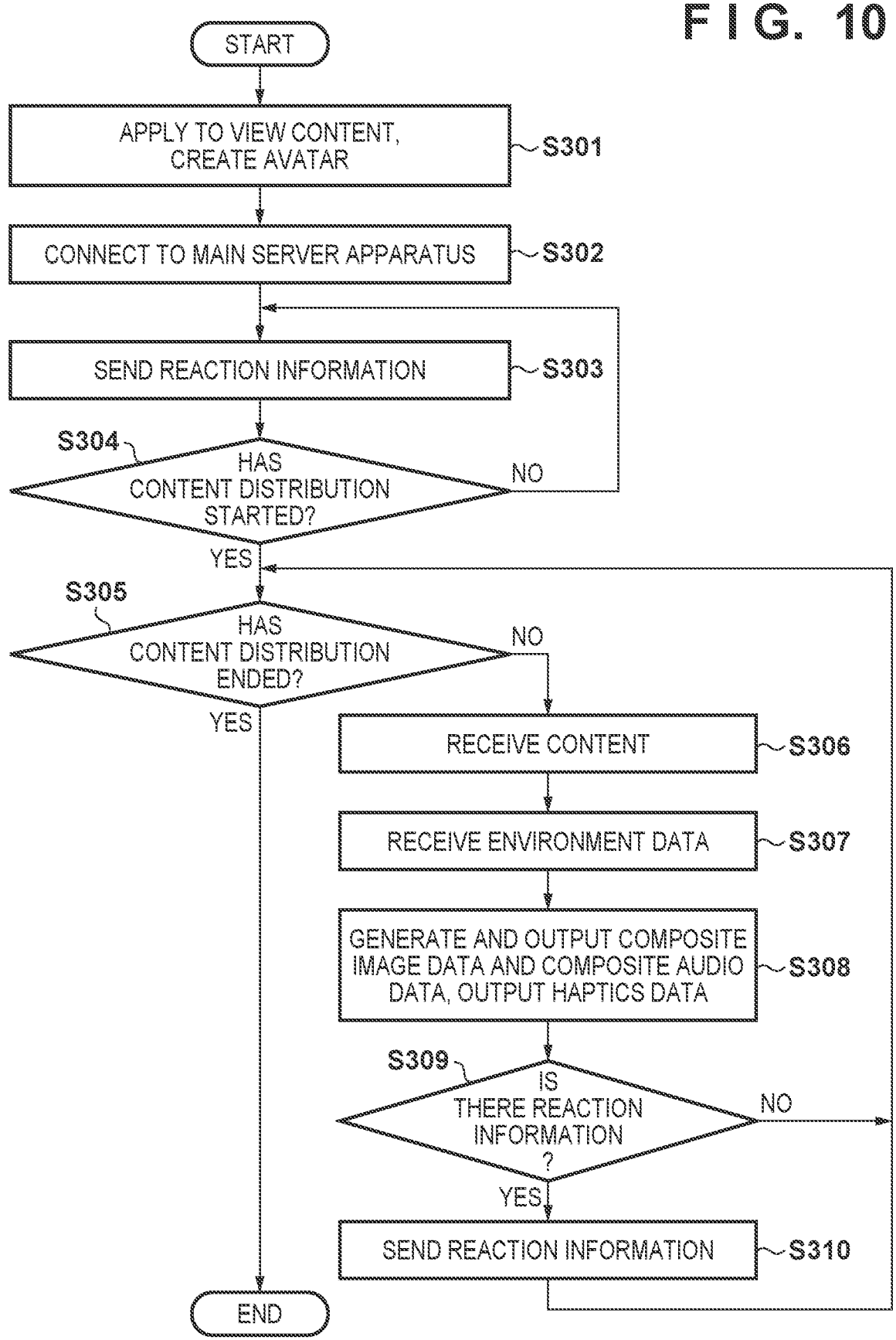
FIG. 10 is a flowchart illustrating processing performed by the viewing apparatus according to the first embodiment.

Viewing processing performed by the viewing apparatus 400 according to the present embodiment will be described next with reference to FIG. 10.

First, in step S301, the viewing apparatus 400 connects to the sub server apparatus 300, selects an audience seat in the virtual audience seat space 5, applies to view the content, creates an avatar, and sends the created avatar information to the sub server apparatus 300. In the example illustrated in FIG. 8B, by selecting one of audience seats A to P set in the virtual audience seat space 5, each viewing apparatus 400 can view the content as seen from the position of the selected audience seat.

Next, in step S302, the viewing apparatus 400 connects to the main server apparatus 200, which is the distributor of the content, and then, in step S303, the motion detection unit 410 and the microphone 408 obtain the reaction information of the viewer and send the information to the sub server apparatus 300 over the network 500.

In step S304, it is determined whether the main server apparatus 200 has started distributing the content. If the distribution has not been started, the sequence returns to step S303, and the processing is repeated while standing by for the content distribution to start. When the content distribution is started, the sequence moves to step S305.

In step S305, it is determined whether the main server apparatus 200 has ended the distribution of the content, and if so, the processing ends. However, if the distribution has not been ended, the content distributed from the main server apparatus 200 is received in step S306, and the environment data distributed from the sub server apparatus 300 is then obtained in step S307.

In step S308, image data and audio data as seen from the current viewpoint are generated from the content obtained in step S306 and composited with the environment data obtained in step S307, and the composite image data and the composite audio data are then output from the display unit 405 and the speaker 409, respectively. The haptics device 414 is also driven based on the haptics data included in the environment data.

In step S309, it is determined whether the reaction information of the viewer has been obtained from the motion detection unit 410 and the microphone 408. If the reaction information has not been obtained, the sequence returns to step S305, whereas if the reaction information has been obtained, the sequence moves to step S310, and then returns to step S305 after the reaction information is sent to the sub server apparatus 300.

FIGS. 11A to 11D are diagrams illustrating the relationships between the audience seats in the virtual audience seat space 5 illustrated in FIG. 8B and the displayed image. FIG. 11A is a conceptual diagram illustrating an example of the positional relationships between the virtual stage space 4 and the audience seats in the virtual audience seat space 5, and FIG. 11B is a diagram illustrating an example of an image and audio when the content distributed from the main server apparatus 200 is viewed from the viewpoint of the audience seat E selected by the viewing apparatus 400. FIG. 11C is a diagram illustrating an example of an image and audio based on environment data generated taking the audience seat E selected by the viewing apparatus 400 in the virtual audience seat space 5 distributed from the sub server apparatus 300 as the position of the viewpoint, and FIG. 11D is a diagram illustrating an example of an image and audio obtained by compositing those illustrated in FIGS. 11B and 11C.

In this case, as illustrated in FIG. 11D, the avatar of the viewing apparatus 400 located at the adjacent audience seat D is displayed so as to enter the field of view, and the audio of the neighboring audience seats D, I, and J is output by compositing that audio with the audio of the content. In addition, when configuring the environment image data, the sub server apparatus 300 sets a restriction on the movement of the avatars such that the avatars of the plurality of viewing apparatuses 400 in the virtual audience seat space 5 do not share the same three-dimensional coordinates, with the exception of the outlines of the avatars, and adjusts the position of the viewpoint. Additionally, when the outlines of a plurality of avatars share the same three-dimensional coordinates, a sound expressing contact may be generated and composited with the environment audio data.

When generating the environment data, the sub server apparatus 300 generates the haptics data, which provides a sense of contact as between users in a physical space, for the viewing apparatuses 400, among the plurality of viewing apparatuses 400 for the avatars sharing the same coordinate positions, that have the haptics device 414.

Figure 12B:
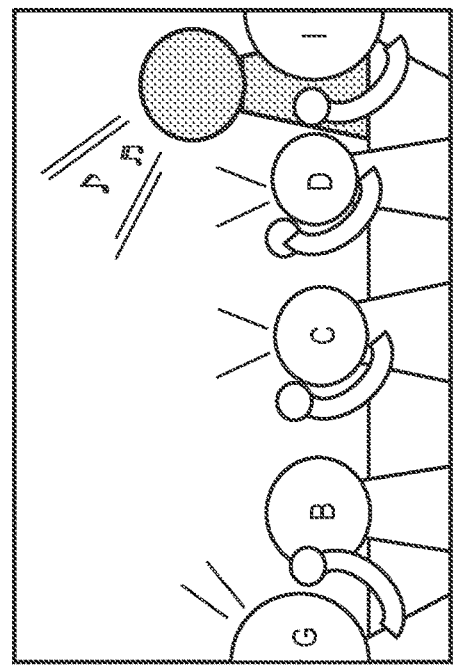
FIGS. 12A to 12D are diagrams illustrating a relationship between a different viewpoint in the cyber space and the displayed image according to the first embodiment.
Figure 12D:
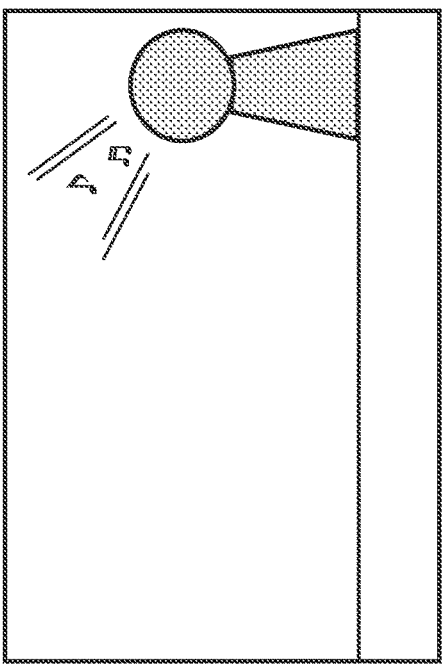
Figure 12A:
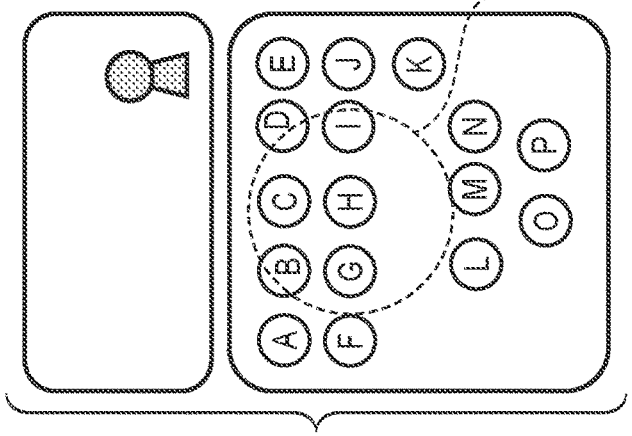
Figure 12C:
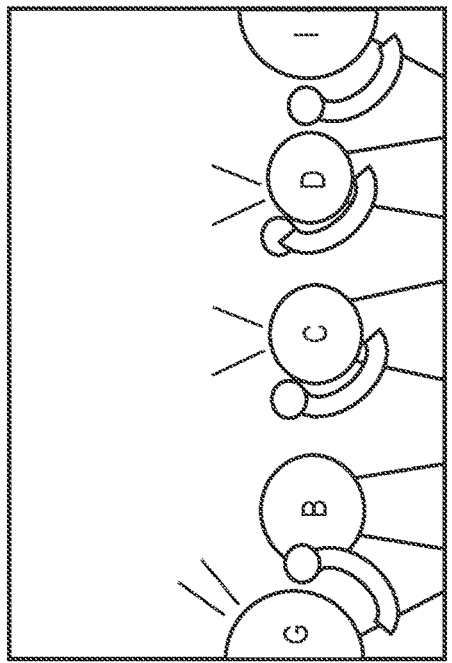

FIGS. 12A to 12D are diagrams illustrating the relationship between another audience seat in the cyber space illustrated in FIG. 8B and the displayed image. FIG. 12A is a conceptual diagram illustrating an example of the positional relationship between the virtual stage space 4 and the audience seats in the virtual audience seat space 5, and illustrates a case where the viewpoint of the viewing apparatus 400 is positioned at audience seat H. Here, the image and audio for a case where the content distributed from the main server apparatus 200 is viewed from the viewpoint of the audience seat H are indicated in FIG. 12B, and the image and audio based on the environment data generated using the audience seat H as the viewpoint, distributed from the sub server apparatus 300, are indicated in FIG. 12C. In this case, an image obtained by compositing those of FIGS. 12B and 12C is displayed such that the avatars of the viewing apparatuses 400 from the audience seats G, B, C, D, and I, which are in front of and to the left and right of the audience seat H, enter the field of view, and the audio from the audience seats G, B, C, D, and I around the audience seat H is output having been composited with the audio of the content. If the viewing apparatus 400 of the audience seat H includes the haptics device 414, haptics data that conveys a sense of contact between the avatars is output, in the same manner as in the example described above.

As described above, according to the first embodiment, when viewing distributed content, information on other viewers viewing the same content can be composited and expressed with the content to obtain a greater sense of immersion.

Additionally, the haptics device can be used to express contact with other viewers to provide an even greater sense of immersion.

The foregoing has described an example in which the main server apparatus 200 distributes the 3D spatial data with audio having added thereto parameters for allowing only the generation of the image data and the audio data from the viewpoint of each viewing apparatus 400. However, the present disclosure is not limited thereto, and the main server apparatus 200 may generate the image data and audio data from the viewpoint of each viewing apparatus 400 to which the data is distributed from the 3D spatial data with audio, and distribute the generated data. In this case, the viewpoint of each of the viewing apparatuses 400 calculated in the sub server apparatus 300 is obtained as necessary.

Although the foregoing describes the haptics device and haptics data as being related to the sense of touch, the present disclosure is not limited thereto, and the haptics device and haptics data may be related to any sensory information aside from vision and hearing. Aside from tactile information, the sensory information may be taste information or smell information, for example.

Variation

Although the foregoing first embodiment described a case where the environment image is rendered in the sub server apparatus 300, the environment image may be rendered in the viewing apparatus 400. In this case, the avatar information and reaction information from the audience seats in the field of view is received from the sub server apparatus 300 based on the positional relationship between the viewpoint of the viewing apparatus 400 and the virtual stage space 4. Then, in the viewing apparatus 400, the environment image data and the environment audio data are generated, composited with the distributed content, and output. If the viewing apparatus 400 includes the haptics device 414, the viewing apparatus 400 generates the haptics data and drives the haptics device 414.

FIG. 6B illustrates an example of the avatar information and reaction information received from the sub server apparatus 300 in the present variation.

According to the present variation as described thus far, not only can the same effects as those of the first embodiment be achieved, but it is no longer necessary for the sub server apparatus 300 to generate environment data for all of the viewing apparatuses 400 to which content is to be distributed, and the load on the sub server apparatus 300 can therefore also be reduced.

Second Embodiment

A second embodiment of the present disclosure will be described next.

The first embodiment described a case where the environment data output from the sub server apparatus 300 is composited with the content output from the main server apparatus 200 and then output in order to achieve a sense of immersion. However, depending on the viewer, the viewing environment, and the like, the viewer may wish to enjoy the content distributed from the main server apparatus 200 as-is. The second embodiment will describe control for not outputting environment images, environment audio, and haptics based on the environment data in such a case.

The configurations of the main server apparatus 200, the sub server apparatus 300, and the viewing apparatus 400, as well as the processing by the main server apparatus 200 and the sub server apparatus 300, are the same as those described in the first embodiment above, and will therefore not be described here.

Figure 13:
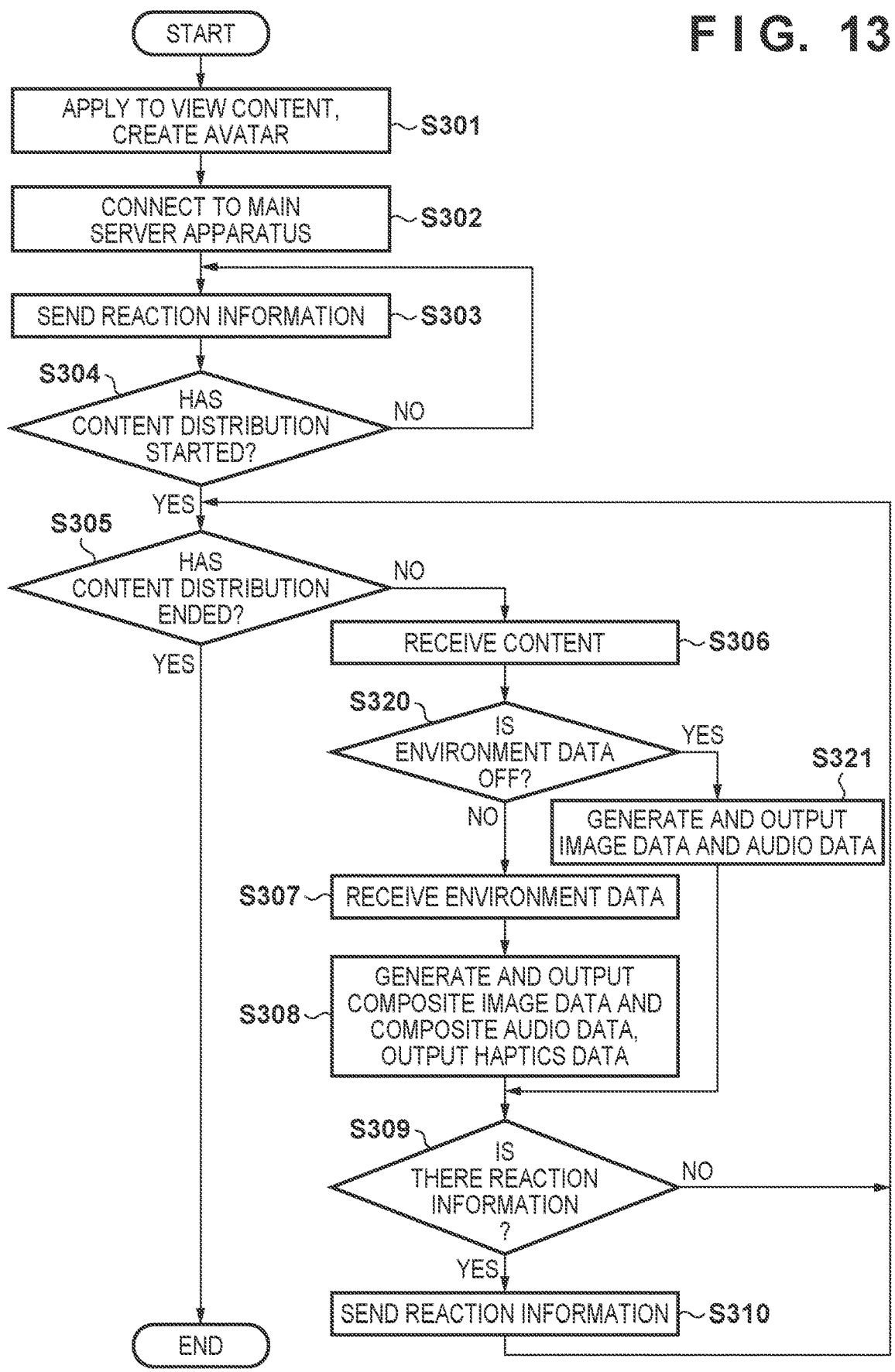
FIG. 13 is a flowchart illustrating processing performed by the viewing apparatus according to a second embodiment.

FIG. 13 is a flowchart illustrating viewing processing performed by the viewing apparatus 400 according to the second embodiment. Here, processing for determining whether to turn off the output of the environment data output from the sub server apparatus 300 has been added to the processing illustrated in FIG. 10. Note that steps that are the same as those illustrated in FIG. 10 will be given the same reference signs, and descriptions thereof will be omitted as appropriate.

If the content is being distributed (NO in step S305), the content is received from the main server apparatus 200 in step S306, after which it is determined, in step S320, whether an instruction to turn off the output of the environment data sent from the sub server apparatus 300 has been made.

Note that various methods are conceivable as methods for turning the output of the environment data on and off. For example, a physical switch for turning the output of the environment data on and off may be provided, or a software button rendered on the screen of the display unit 405 may be turned on and off using a program by operating the touch panel, an operation member, or the like.

If an instruction to turn the output of the environment data off has not been made, the sequence moves to step S307, whereas if an instruction to turn the output of the environment data off has been made, the sequence moves to step S321. Then, the image data and the audio data from the current viewpoint are generated from the content distributed from the main server apparatus 200, the generated image data and audio data are output, and the sequence moves to step S309.

If the output of the environment data sent from the sub server apparatus 300 is turned off in this manner, in the example illustrated in FIGS. 11A to 11D, the image illustrated in FIG. 11B will be displayed, whereas in the example illustrated in FIGS. 12A to 12D, the image illustrated in FIG. 12B will be displayed.

According to the second embodiment as described thus far, the output of the environment data distributed from the sub server apparatus 300 can be turned on and off in accordance at the viewer's discretion, which makes it possible for the viewer to view the content according to their preferences, the state of other avatars, and the like.

Note that a fee may be charged to turn the output of the environment data off, and in this case, a notification that a fee will be charged to turn the environment data off is issued to the viewing apparatus 400. If the viewer of the viewing apparatus 400 accepts the fee, a procedure for charging the fee is performed, after which control is performed such that the environment data is not distributed from the sub server apparatus 300 to the viewing apparatus 400.

Third Embodiment

A third embodiment of the present disclosure will be described next.

The first and second embodiments described cases where the audience seat of the viewing apparatus 400 in the virtual audience seat space 5 is determined in advance. The third embodiment, however, will describe a case where movement is possible within the virtual audience seat space 5.

The configurations of the main server apparatus 200, the sub server apparatus 300, and the viewing apparatus 400, as well as the processing by the main server apparatus 200 and the viewing apparatus 400, are the same as those described in the first embodiment above, and will therefore not be described here.

Figure 14A:
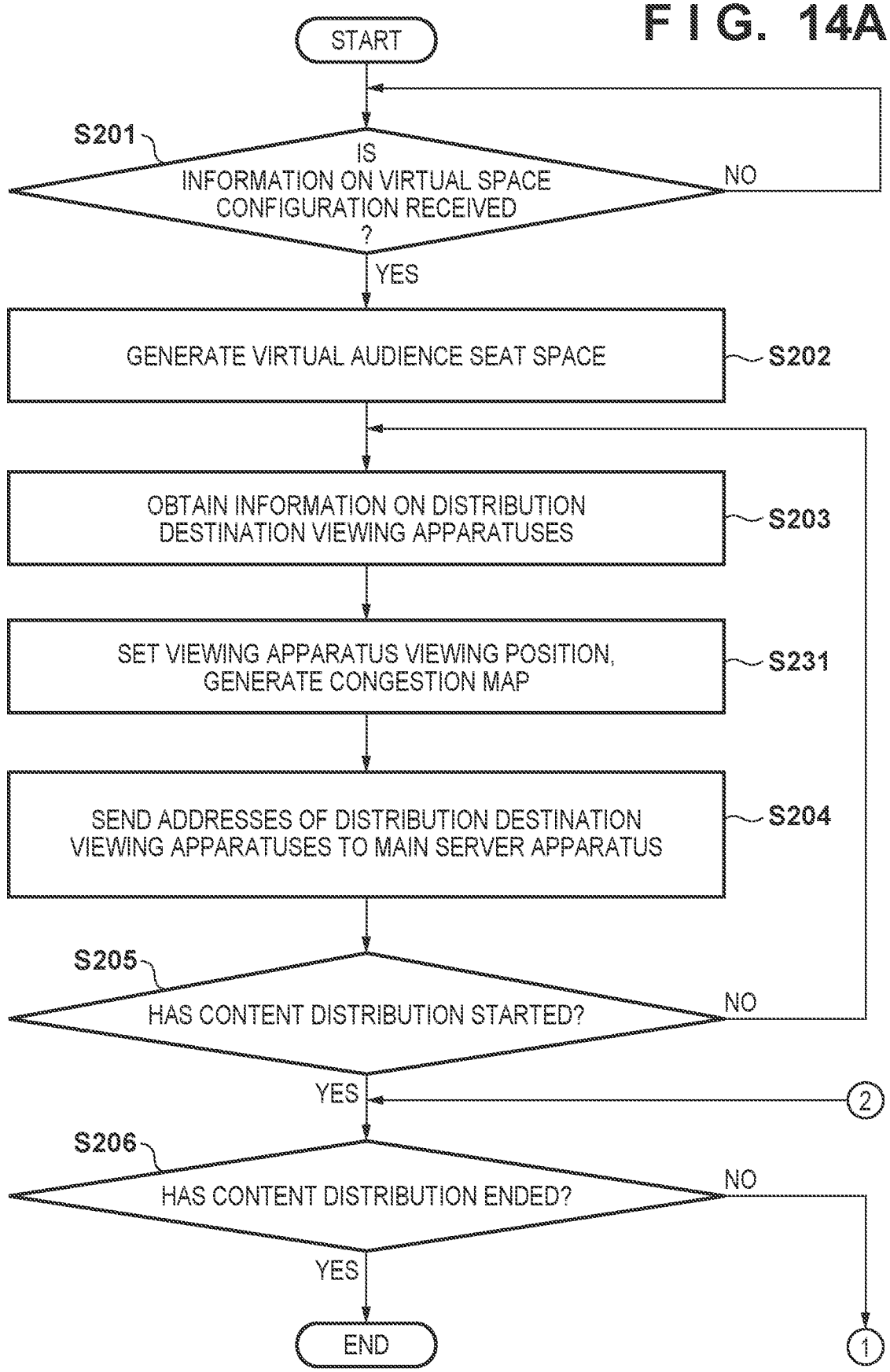
FIGS. 14A and 14B show a flowchart illustrating processing performed by the sub server apparatus according to a third embodiment.
Figure 14B:
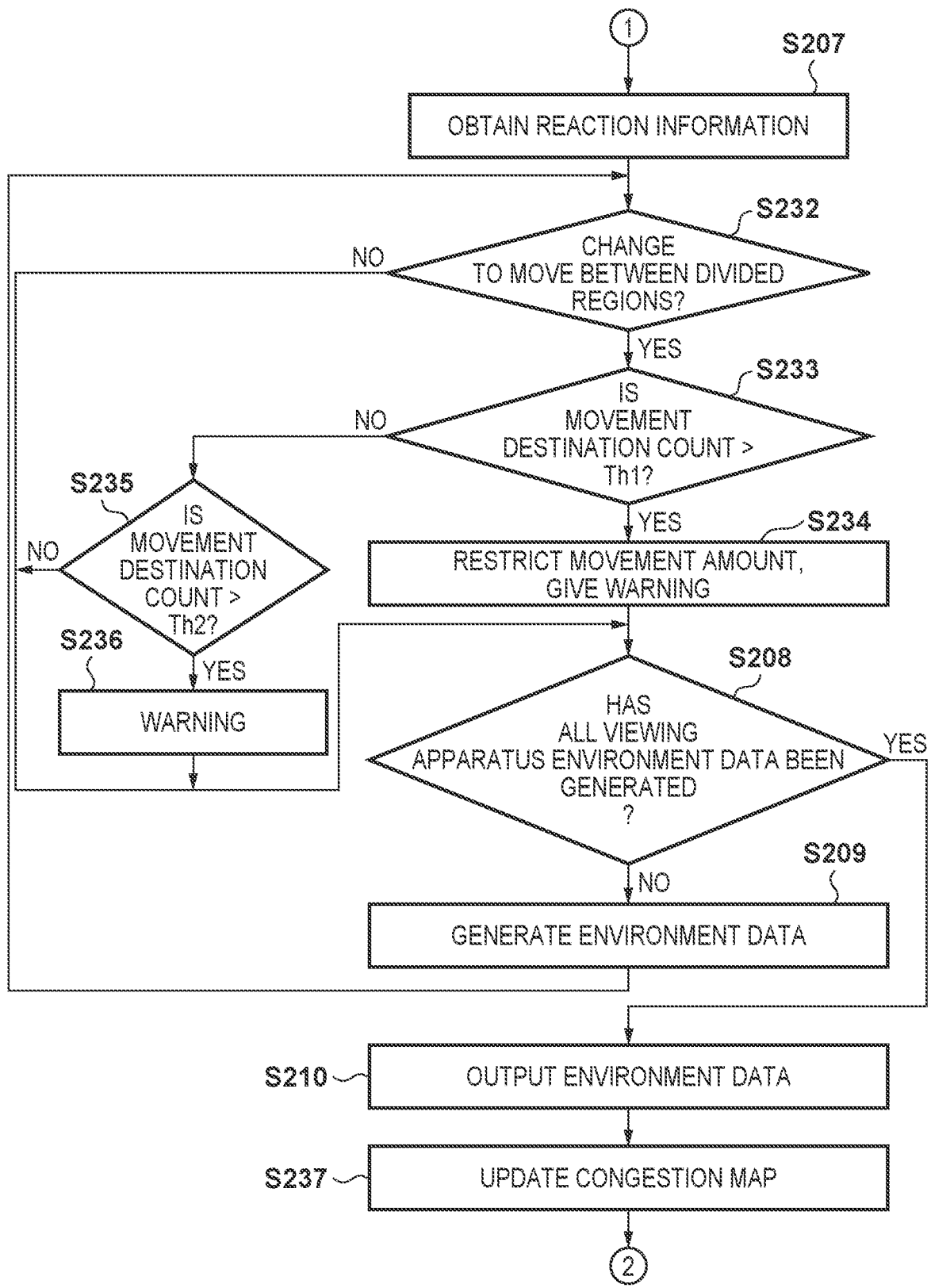

FIGS. 14A and 14B show a flowchart illustrating processing performed by the sub server apparatus 300 according to the third embodiment.

Figures 15A, 15B:
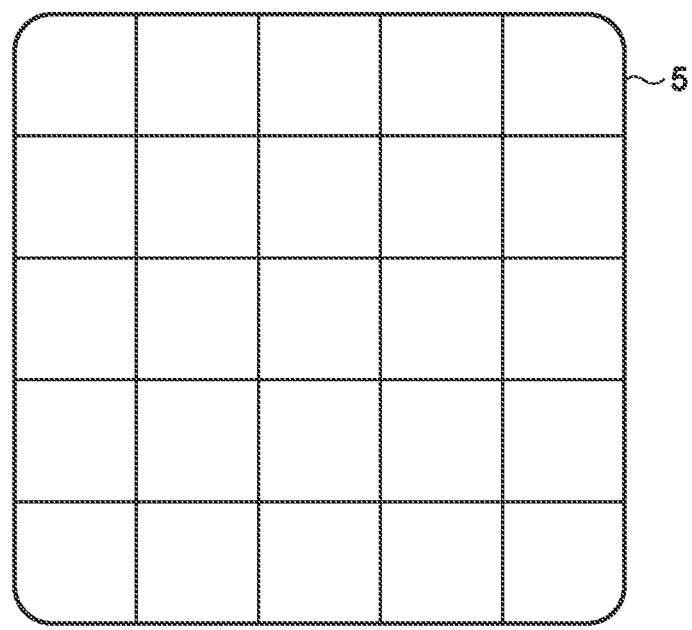
FIGS. 15A and 15B are diagrams illustrating examples of congestion maps according to the third embodiment.

First, in step S201, the apparatus stands by for the information on the configuration of the cyber space sent from the main server apparatus 200 in step S104. Once the information on the configuration of the cyber space is received, the sequence moves to step S202, and the virtual audience seat space 5 is generated. Here, it is assumed that the virtual audience seat space 5 is divided into a plurality of regions, as illustrated in FIG. 15A.

When the calculation of the configuration of the virtual audience seat space 5 in step S202 ends, in step S203, the main server apparatus 200 searches for the viewing apparatuses 400 that wish to view the content before the content distribution is started. Information such as the avatar information, the IP address, and the like of the viewing apparatus 400 that wishes to view the content is then obtained.

Next, in step S231, a viewing position of the viewing apparatus 400 is set to a desired position in the virtual audience seat space 5 that does not overlap with the viewing positions of the other viewing apparatuses 400, and a congestion map is generated. FIG. 15B is a diagram illustrating an example of the congestion map, and illustrates an example of divided regions in the virtual audience seat space 5 and the total number of viewing apparatuses 400 having viewing positions within each divided region. The sub server apparatus 300 counts the number of viewing positions of the viewing apparatuses 400 in each divided region and stores that number in association with the corresponding divided region.

Once the congestion map is generated, in step S204, the IP addresses of the viewing apparatuses 400 that wish to view the content are sent to the main server apparatus 200.

Note that a fee may be charged when an application to view the content is made, and the amount charged may differ depending on the location of the audience seat.

Next, in step S205, it is determined whether or not the main server apparatus 200 has started distributing the content. If so, the sequence moves to step S206, and if not, the sequence returns to step S203 and the processing is repeated.

In step S206, it is determined whether the main server apparatus 200 has ended the distribution of the content, and if so, the processing ends. However, if the distribution has not ended, the sequence moves to step S207, where the reaction information is obtained from the viewing apparatuses 400 to which the content is being distributed.

Then, in step S232, whether the viewer of the viewing apparatus 400 has moved between divided regions is determined based on the change amount information in the reaction information obtained in step S207. If not, the sequence moves to step S208, but if so, the sequence moves to step S233.

In step S233, it is determined, based on the congestion map, whether the counted number of the divided region in the direction in which the viewer moved is greater than a predetermined first threshold Th1. If the number is greater than the first threshold Th1, in step S234, the movement between the divided regions in the virtual audience seat space 5 is disabled such that the viewer does not cross into the other divided region, and a notification indicating that movement in that direction is not possible is issued to the viewing apparatus 400, after which the sequence moves to step S208. At this time, guidance such as "you cannot move in that direction" may be provided as text or audio, or an image showing a crowd of avatars too thick to move through may be generated to present a visual indication that movement in that direction is impossible, a sound indicating that avatars are in contact with each other may be generated and output, or the like.

Furthermore, the sub server apparatus 300 may generate and output the haptics data, which provides a sense of contact as between users in a physical space, to the viewing apparatus 400 having the haptics device 414. Alternatively, haptics data may be generated to provide a sense of coming into contact with a predetermined hard, flat surface, such as a wall, in the direction in which movement is not possible.

On the other hand, if the number is not greater than the predetermined first threshold Th1, the sequence moves to step S235, where it is determined whether the counted number in the divided region in the direction of movement is greater than a predetermined second threshold Th2 higher than the first threshold Th1. If the number is not greater than the second threshold Th2, the sequence moves to step S208. However, if the number is greater than the second threshold Th2, the sequence moves to step S236, where a notification indicating that the destination divided region is crowded is issued, after which the sequence moves to step S208. At this time, guidance such as "the area is too crowded" may be provided as text or audio, or an image showing a thick crowd of avatars may be generated to present a visual indication of the crowding, a sound indicating that the avatars are in contact with each other may be generated and output, or the like.

Furthermore, the sub server apparatus 300 may generate and output the haptics data, which provides a sense of contact as between users in a physical space, to the viewing apparatus 400 having the haptics device 414.

In step S208, it is determined whether the environment data has been generated for each of the viewing apparatuses 400 to which the content is being distributed. If there is a viewing apparatus 400 for which the environment data has not been generated, in step S209, the environment data for that viewing apparatus 400 is generated, after which the sequence returns to step S232.

However, if the environment data has been generated for all the viewing apparatuses 400 to which the content is being distributed, the environment data generated in step S210 is output to each viewing apparatus 400. The number of viewing positions set in each divided region is then counted in step S237, the congestion map is updated, and the sequence returns to step S206. Note that the timing at which the environment data is output is not limited thereto, and the environment data may be output to each corresponding viewing apparatus 400 in sequence each time the environment data is generated in step S209.

According to the third embodiment described thus far, a greater sense of immersion can be achieved in a situation where movement within the virtual audience seat space 5 is possible, such as during an outdoor concert in a physical space, for example.

Variation

A desired fee may be set for the divided regions into which the virtual audience seat space 5 is divided. In this case, if, when the motion information indicates movement between divided regions, the counted number for the divided region being moved to is not greater than the first threshold Th1 and the fee will change, a notification to that effect may be issued to the viewing apparatus 400. If the viewer of the viewing apparatus 400 accepts the fee change, a procedure for charging the fee is performed, the motion information is enabled, and the viewer is then able to move between the divided regions based on the motion information. On the other hand, if the viewer of the viewing apparatus 400 does not accept the fee change, the motion information is disabled, and the viewer is prevented from moving between the divided regions based on the motion information.

The first threshold Th1 may also be set for each divided region. For example, it is conceivable to use a setting method which sets a higher fee, and reduces the first threshold Th1 to provide a better viewing environment, for divided regions that are closer to the virtual stage space 4.

Additionally, a divided region in which only viewers who are members can establish viewing positions may be set in advance, for example.

In this manner, the distributor of the content may be capable of setting various conditions as appropriate, such as fees that allow viewing positions to be set in divided regions.

OTHER EMBODIMENTS

Although the foregoing embodiments described a single virtual audience seat space 5 as being provided for the virtual stage space 4, the present disclosure is not limited thereto, and a plurality of virtual audience seat spaces 5 may be provided for a single virtual stage space 4. In this case, the viewpoint, viewing position, environment data, and the like of the viewing apparatus 400 may be controlled for each virtual audience seat space 5.

The foregoing embodiments have described the main server apparatus 200 as distributing the content and the sub server apparatus 300 as generating and sending the environment data. However, the present disclosure is not limited thereto, and the content may be distributed, and the environment data generated and sent, by a single server apparatus.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of priority from Japanese Patent Application No. 2023-035860, filed Mar. 8, 2023, and Japanese Patent Application No. 2023-205438, filed Dec. 5, 2023, which are hereby incorporated by reference herein in their entirety.

What is claimed is:

1. An image sharing method including:
    generating first image data of an image from a viewpoint at a position based on image data obtained from a plurality of image capturing apparatuses that capture images of the same subject simultaneously;
    setting a cyber space for viewing the first image data from a plurality of viewing apparatuses;
    distributing the first image data to each of the plurality of viewing apparatuses;
    obtaining, from each viewing apparatus among the plurality of viewing apparatuses, information on an avatar, an initial viewing position in the cyber space, and motion information of a viewer who uses the viewing apparatus for the viewing; and
    sending, to each viewing apparatus, environment data pertaining to an avatar of another viewing apparatus that enters a field of view of the viewing apparatus in the cyber space, based on a viewpoint in the cyber space obtained based on the initial viewing position and the motion information.

2. The image sharing method according to claim 1, further comprising:
    obtaining, from each viewing apparatus, an instruction to turn the sending of the environment data on or off, and not sending the environment data for the viewing apparatus that has instructed the sending to be turned off.

3. The image sharing method according to claim 2, further comprising:
    notifying each viewing apparatus of a fee for turning the sending of the environment data off, and
    enabling the instruction to turn the sending of the environment data off for a viewing apparatus that has accepted the fee being charged.

4. The image sharing method according to claim 1,
    wherein in the setting, a plurality of positions are set in the cyber space, and
    in the obtaining, a position selected by each viewing apparatus from unselected ones of the plurality of positions is obtained as the initial viewing position of the corresponding viewing apparatus.

5. The image sharing method according to claim 1,
    wherein in the obtaining, a different position in the cyber space is obtained as the initial viewing position for each of the plurality of viewing apparatuses.

6. The image sharing method according to claim 5,
    wherein in the setting, the cyber space is divided into a plurality of regions,
    the image sharing method further comprising:
    counting a total number of the viewpoints included in each of the plurality of regions; and
    if the obtained motion information for each viewing apparatus indicates movement between two regions, and a number of the viewpoints in a region being moved to is greater than a predetermined first threshold, disabling the movement between the regions.

7. The image sharing method according to claim 6, further comprising:
    notifying the corresponding viewing apparatus that the movement has been disabled, in a case where the movement between regions has been disabled.

8. The image sharing method according to claim 6, further comprising:
    if the obtained motion information for each viewing apparatus indicates movement between two regions, and the total number of the viewpoints in the region being moved to is not greater than the first threshold and is greater than a predetermined second threshold lower than the first threshold, notifying the corresponding viewing apparatus that the region is crowded.

9. The image sharing method according to claim 8,
wherein in the setting, a fee is set for each of the plurality of regions, and
if the obtained motion information for each viewing apparatus indicates movement between two regions, and the fee for the two regions is different, the corresponding viewing apparatus is notified that the fee is different, and the movement between the regions is allowed when the viewing apparatus accepts a change to the fee.

10. The image sharing method according to claim 1,
wherein in the distributing, a parameter permitting only generation of the image from the viewpoint is added to the first image data and distributed to each viewing apparatus.

11. The image sharing method according to claim 1,
wherein in the obtaining, second image data indicating the avatar of the other viewing apparatus within the field of view of each viewing apparatus in the cyber space is generated as the environment data.

12. The image sharing method according to claim 11,
wherein in the obtaining, the second image data is generated such that the avatars of the plurality of viewing apparatuses do not share same three-dimensional coordinates in the cyber space, and the viewpoint is adjusted based on positions of the avatars.

13. The image sharing method according to claim 1,
wherein in the distributing, first audio data obtained during the capturing of images by the plurality of image capturing apparatuses is further distributed,
in the obtaining, audio data of the viewer is further obtained from each viewing apparatus, and
in the sending, second audio data obtained by compositing audio data from another viewing apparatus within a predetermined range around each viewing apparatus is further distributed to each viewing apparatus based on the viewpoint.

14. The image sharing method according to claim 13,
wherein in the sending, in a case where outlines of a plurality of the avatars share same three-dimensional coordinates in the cyber space, audio data of a sound expressing contact is generated, composited with the second audio data, and distributed to each viewing apparatus.

15. The image sharing method according to claim 1,
wherein in the obtaining, configuration information of an output device included in each viewing apparatus is further obtained.

16. The image sharing method according to claim 15,
wherein in a case where the configuration information indicates that an output device corresponding to one or more of senses aside from vision and hearing is included, in the sending, sense information data pertaining to the one or more of the senses to which the output device corresponds is generated and sent.

17. The image sharing method according to claim 16,
wherein the senses aside from vision and hearing include at least one of a sense of touch, a sense of taste, and a sense of smell.

18. The image sharing method according to claim 16,
wherein in a case where the configuration information indicates that an output device corresponding to a sense of touch is included, if outlines of a plurality of the avatars share same three-dimensional coordinates in the cyber space in the sending, tactile data expressing contact is generated as the sense information data based on the information of the avatars obtained in the obtaining, and is sent to the corresponding viewing apparatus.

19. The image sharing method according to claim 18,
wherein the information on the avatar includes at least one of hardness, roughness, friction, and temperature.

20. The image sharing method according to claim 18,
wherein in the sending, an outline shape, a color, and a texture state of the avatar included in the information on the avatar are detected, and the tactile data is generated based on a detection result.

21. The image sharing method according to claim 16,
wherein the configuration information includes body part information indicating a body part on which the viewer is wearing the output device, and
in the sending, only sense information data corresponding to the body part is generated based on the body part information, and is sent to the corresponding viewing apparatus.

22. The image sharing method according to claim 1,
wherein in the distributing, the first image data is generated based on the viewpoint obtained for each viewing apparatus, and is distributed to each viewing apparatus.

23. An image sharing system comprising one or more processors and/or circuitry which function as:
a distributing unit that generates first image data capable of generating an image from a viewpoint at a position based on image data obtained from a plurality of image capturing apparatuses that capture images of the same subject simultaneously, and distributes the first image data to a plurality of viewing apparatuses;
a setting unit that sets a cyber space for viewing the first image data from the plurality of viewing apparatuses, prior to the distribution;
an obtainment unit that obtains, from each viewing apparatus among the plurality of viewing apparatuses, information on an avatar, an initial viewing position in the cyber space, and motion information of a viewer who uses the viewing apparatus for the viewing; and
a processing unit that sends, to each viewing apparatus, environment data pertaining to an avatar of another viewing apparatus that enters a field of view of the viewing apparatus in the cyber space, based on a viewpoint in the cyber space obtained based on the initial viewing position and the motion information.

24. A non-transitory computer-readable storage medium, the storage medium storing a program that is executable by the computer, wherein the program includes program code for causing the computer to perform an image sharing method comprising:
generating first image data of an image from a viewpoint at a position based on image data obtained from a plurality of image capturing apparatuses that capture images of the same subject simultaneously;
setting a cyber space for viewing the first image data from a plurality of viewing apparatuses, prior to the distributing;
distributing the first image data to each of a plurality of viewing apparatuses;
obtaining, from each viewing apparatus among the plurality of viewing apparatuses, information on an avatar, an initial viewing position in the cyber space, and motion information of a viewer who uses the viewing apparatus for the viewing; and
sending, to each viewing apparatus, environment data pertaining to an avatar of another viewing apparatus that enters a field of view of the viewing apparatus in the cyber space, based on a viewpoint in the cyber space obtained based on the initial viewing position and the motion information.

\* \* \* \* \*